United States Patent
Kim et al.

(10) Patent No.: US 8,689,389 B2
(45) Date of Patent: Apr. 8, 2014

(54) CONNECTING UNIT FOR WIPER ARM AND FLAT WIPER BLADE WITH THE SAME

(75) Inventors: In Kyu Kim, Ansan-si (KR); Kyung Jong Nam, Chungcheongnam-do (KR)

(73) Assignee: The Korea Development Bank, Seoul (KR)

( * ) Notice: Subject to any disclaimer, the term of this patent is extended or adjusted under 35 U.S.C. 154(b) by 0 days.

(21) Appl. No.: 13/819,250

(22) PCT Filed: Sep. 8, 2011

(86) PCT No.: PCT/KR2011/006661
§ 371 (c)(1),
(2), (4) Date: Feb. 26, 2013

(87) PCT Pub. No.: WO2012/033364
PCT Pub. Date: Mar. 15, 2012

(65) Prior Publication Data
US 2013/0152330 A1    Jun. 20, 2013

(30) Foreign Application Priority Data

Sep. 10, 2010   (KR) .................. 10-2010-0089010
Aug. 19, 2011   (KR) .................. 10-2011-0082823

(51) Int. Cl.
*B60S 1/38*    (2006.01)
*B60S 1/40*    (2006.01)

(52) U.S. Cl.
USPC ............. 15/250.201; 15/250.43; 15/250.32

(58) Field of Classification Search
USPC ......... 15/250.32, 250.361, 250.201, 250.351, 15/250.43, 250.44, 250.33
See application file for complete search history.

(56) References Cited

U.S. PATENT DOCUMENTS

| | | | |
|---|---|---|---|
| 7,908,703 B2 | 3/2011 | Van Bealen | |
| 2005/0177970 A1 | 8/2005 | Scholl et al. | |
| 2006/0117515 A1 | 6/2006 | Fink et al. | |
| 2008/0289133 A1 | 11/2008 | Kim | |
| 2009/0178226 A1* | 7/2009 | Lee et al. | 15/250.32 |
| 2009/0307862 A1 | 12/2009 | Boland | |
| 2010/0005609 A1* | 1/2010 | Kim | 15/250.32 |
| 2011/0247166 A1 | 10/2011 | Depondt et al. | |
| 2012/0000028 A1 | 1/2012 | Wilms et al. | |
| 2012/0144615 A1* | 6/2012 | Song et al. | 15/250.32 |

FOREIGN PATENT DOCUMENTS

KR    10-2005-0007446 A    1/2005
KR    10-2005-0085129 A    8/2005
(Continued)

OTHER PUBLICATIONS

International Searching Authority International Search Report for PCT/KR2011/006661 dated Apr. 26, 2012.

*Primary Examiner* — Gary Graham
(74) *Attorney, Agent, or Firm* — Sughrue Mion, PLLC

(57) ABSTRACT

A connecting unit for a flat wiper blade is provided. The connecting unit separably connects the flat wiper blade to a wiper arm having one of the following: a first coupling element including a top plate and a pair of side plates having a concave portion at a rear end; a second coupling element including a top plate and a pair of side plates; and a third coupling element including a side pin and a clip arm. The connecting unit has a bracket fixed to a frame of the flat wiper blade and an adaptor. The adaptor is pivotally mounted on the bracket via a pivot shaft of the bracket. The adaptor has first to third fixing devices separably fixing the adaptor to the first to third coupling elements respectively. The flat wiper blade is connected to the wiper arms via the adaptor.

11 Claims, 16 Drawing Sheets

(56) References Cited

FOREIGN PATENT DOCUMENTS

| KR | 10-2006-0134912 A | 12/2006 |
| KR | 10-0725988 B1 | 6/2007 |
| KR | 10-2008-0059225 A | 6/2008 |
| KR | 10-2008-0102564 A | 11/2008 |
| KR | 10-2008-0108360 A | 12/2008 |
| KR | 10-2009-0042785 A | 4/2009 |
| KR | 10-2010-0023942 A | 3/2010 |
| WO | 2010/028866 A1 | 3/2010 |

* cited by examiner

CONNECTING UNIT FOR WIPER ARM AND FLAT WIPER BLADE WITH THE SAME

CROSS REFERENCE TO RELATED APPLICATIONS

This application is a National Stage of International Application No. PCT/KR2011/006661 filed Sep. 8, 2011, claiming priority based on Korean Patent Application Nos. 10-2010-0089010 filed Sep. 10, 2010 and 10-2011-0082823 dated Aug. 19, 2011, the contents of all of which are incorporated herein by reference in their entirety.

TECHNICAL FIELD

The present invention relates to a flat wiper blade for use with a windshield of a vehicle. In particular, the present invention relates to a flat wiper blade with a connecting unit configured to be separably connected to a wiper arm.

BACKGROUND ART

Motor vehicles are equipped with a windshield wiper device for cleaning or wiping a surface of a windshield. The windshield wiper device includes a wiper motor, a wiper arm and a wiper blade. The wiper arm is connected to a rotating shaft of the wiper motor at its base end and is oscillated by the wiper motor. The wiper blade is separably joined to a distal end of the wiper arm. The wiper blade is positioned on the surface of the windshield by the wiper arm. The wiper blade wipes the surface of the windshield while sliding thereon through oscillating movements of the wiper arm.

The wiper blade has an elongated wiper strip and a frame for holding and supporting the wiper strip in its longitudinal direction. The wiper strip is placed in contact with the windshield surface. The frame may comprise an assembly including a main yoke and a plurality of sub yokes linked to the main yoke. A wiper blade with such a frame is known in the art as "a conventional wiper blade." A wiper blade, which uses a single frame curving with a certain curvature and having a thin and elongated bar shape as the frame, has been recently used. Such a wiper blade is known in the art as "a flat wiper blade" or "a flat-bar wiper blade." The flat wiper blade has a height lower than a conventional wiper blade and is subjected to less air resistance when compared to the conventional wiper blade. Further, the flat wiper blade can bring its wiper strip into contact the windshield surface under a uniform load.

The flat wiper blade may be connected to a wiper arm via a connecting unit that is attached to a midway section of a frame and is separably coupled to the wiper arm. Each wiper arm manufacturer has put its own wiper arms for a flat wiper blade in the market. Also, each wiper arm manufacturer or each wiper device manufacturer has put various connecting units, which are configured to be suitable for wiper arms for a flat wiper blade, in the market. Accordingly, there have been known in the art various wiper arms for a flat wiper blade and various connecting units adapted for those wiper arms.

FIGS. 1 to 4 show examples of various wiper arms for a flat wiper blade.

Wiper arms shown in FIGS. 1 and 2 are configured such that their distal ends have a receiving section, concave portions provided at a rear end of the receiving section and a tongue protruding from a front end of the receiving section. These wiper arms are known in the art as "a top lock wiper arm" or "a pinch tab wiper arm." Korean Patent Application Publication No. 10-2005-0085129 and Korean Patent Application Publication No. 10-2005-0007446 disclose a connection example between a flat wiper blade and a top lock wiper arm. These references teach that a connecting unit is connected to the wiper arm 1, 1' in such a manner that the connecting unit catches a tongue 13, 13' at its one end and snap-engages concave portions 14a, 14b, 14a, 14b' at its opposite end.

A wiper arm shown in FIG. 3 is configured so that its distal end defines an insertion space. This wiper arm is known in the art as "a bayonet wiper arm." Korean Patent No. 10-725988 discloses a connection example between a flat wiper blade and a bayonet wiper arm. This reference teaches that a connecting unit is fitted to the insertion space in the distal end of the bayonet wiper arm 2 and is thus joined to the bayonet wiper arm.

A wiper arm shown in FIG. 4 is configured such that its distal end portion has a side pin and a clip arm that protrude perpendicularly to a longitudinal direction of the wiper arm. This wiper arm is known in the art as "a side lock wiper arm," "a side pin wiper arm" or "a slide pin wiper arm." Korean Patent Application Publication No. 10-2008-0059225 discloses a connection example between a flat wiper blade and a side lock wiper arm. This reference teaches that a connecting unit is connected to a wiper arm in such a manner that a side pin 31 passes through a tubular part of a connecting unit and a clip arm 32 is snap-engaged to the connecting unit.

SUMMARY

A flat wiper blade can be connected to the wiper arms 1, 1', 2, 3 shown in FIGS. 1 to 4 when only using a connecting unit configured to be suitable for the shape of the distal end of each wiper arm. That is, various types of connecting units must be prepared according to the shapes of distal ends of wiper arms. As a result, dedicated connecting units, each of which is only suitable for a specific shape of one wiper arm, must be prepared. Thus, the manufacturers manufacturing connecting units must design and develop various different connecting units, each of which is suitable for only one wiper arm. This is clearly disadvantageous since the number of parts constituting a connecting unit is large, thereby not only causing difficulties in development and maintenance, but also increasing manufacturing cost and physical distribution cost. On the other hand, users or consumers must choose a dedicated connecting unit, which is configured to be suitable for a distal end of a wiper arm equipped to their own cars. This is also disadvantageous since they would have difficulty and inconvenience in choosing the right connecting unit.

Further, in case of prior art connecting units disclosed in Korean Patent Application Publications Nos. 10-2005-0085129 and 10-2005-0007446, a pair of elongated bar-shaped parts of the connecting units are snap-engaged to the concave portions 14a, 14b, 14a', 14b' of the wiper arm 1, 1'. The engagement between those bar-shaped parts and the concave portions can become loose due to the configuration of the bar-shaped parts. That is, when a flat wiper blade is oscillated by the wiper arm 1, 1', the wiper arm 1, 1' exerts forces to the flat wiper blade transversely to a longitudinal direction of the flat wiper blade. Then, the bar-shaped parts can be curved inwardly of the flat wiper blade, thereby failing to provide a tight engagement between the bar-shaped parts and the concave portions and further causing clearance or play therebetween. If the wiper arm 1, 1' is used for a long time under such a situation, then the clearance or play becomes gradually greater and the flat wiper blade may be separated from the wiper arm 1, 1' in the end. In addition, since the bar-shaped parts protrude backwardly from the connecting unit, the bar-shaped parts can be bent and broken during transportation or assembly. Further, in case of a prior art connecting unit disclosed in Korean Patent Application Publication No. 10-2008-0059225, a side pin 31 fails to smoothly pivot relative to the connecting unit. Thus, a flat wiper blade cannot be placed in close contact with the surface of the windshield while conforming to the curvature of the windshield surface when the flat wiper blade is moved on the windshield of a vehicle. As described above, the prior art connecting units do not accomplish a firm coupling between a flat wiper blade and a wiper arm and do not provide a smooth pivoting motion of a flat wiper blade.

The present invention is directed to solving the aforementioned problems of the prior art. It is an object of the present invention to provide a connecting unit provided on a flat wiper blade for separably connecting the flat wiper blade to various types of wiper arms.

It is a further object of the present invention to provide a connecting unit, which provides smooth pivoting motion of a flat wiper blade while firmly connecting the flat wiper blade to the wiper arms.

It is another object of the present invention to provide a flat wiper blade with a connecting unit simply and firmly connecting the flat wiper blade to the various types of wiper arms and further comprising spoilers being in engagement with the connecting unit.

To achieve the above and other objects, according to one aspect of the present invention, there is provided a connecting unit for separably connecting a flat wiper blade to a wiper arm that has, at its distal end, one of the following: a first coupling element with a top plate and a pair of side plates having concave portions at a rear end; a second coupling element having a top plate and a pair of side plates; and a third coupling element having a side pin and a clip arm.

The connecting unit comprises: a bracket fixed to a frame of a flat wiper blade and having a pivot shaft; and an adaptor with a pair of sidewall portions each having a pivot hole. The adaptor is pivotally mounted on the bracket as both ends of the pivot shaft are fitted to the pivot holes. The adaptor has a first fixing device, a second fixing device and a third fixing device. The first fixing device is configured to fix the side plate of the first coupling element to an outer surface of the sidewall portion and fix at least a portion of the top plate of the first coupling element relative to upper ends of the sidewall portions. The second fixing device is configured to permit fitting between the side plates of the second coupling element and the sidewall portions and lock a lower end of the side plate of the second coupling element to the sidewall portion. The third fixing device is configured to pivotally bear the side pin of the third coupling element parallel to an axis extending through the pivot holes and fix the clip arm of the third coupling element relative to the sidewall portion.

In an embodiment of the present invention, the first fixing device comprises a pivot pin, a lug, a cover and a cover fixing device. The pivot pin is formed at a rear end of the sidewall portion and is configured to be fitted to the concave portion of the first coupling element. The lug is formed in the sidewall portion as opposite to the pivot pin. A front end of the side plate of the first coupling element is contactable to the lug. The cover is pivotally attached to a front end of the sidewall portion and is configured to cover at least a portion of the first coupling element. The cover fixing device is configured to separably fix the cover to the adaptor to lock the at least the portion of the top plate of the first coupling element relative to the upper end of the sidewall portion.

The cover fixing device comprises: a locking notch located at a lower edge of the cover and having a first engagement surface; and a latch extending from the sidewall portion and being flexible. The latch has a second engagement surface engageable to the first engagement surface at a front end. When the cover is pivoted to the sidewall portion and the first and second engagement surfaces engage each other, the cover fixes the top plate of the first coupling element relative to the upper edge of the sidewall portion.

The locking notch includes a pressure surface adjoining the first engagement surface and the latch includes a contact surface adjoining the second engagement surface. When the cover is pivoted to the adaptor, the pressure surface and the contact surface contact each other to allow the latch to flex relative to the sidewall portion.

The latch may include a second stopper surface adjoining the second engagement surface and the locking notch may include a first stopper surface adjoining the first engagement surface and contacting the second stopper surface.

The sidewall portion may have a stopper configured to abut the lower end of the side plate of the second coupling element. The latch may extend from the stopper.

The adaptor may include a seat surface connecting the upper ends of the sidewall portions. The top plate of the first coupling element may be placed on the seat surface. When the cover is pivoted to the adaptor and the first and second engagement surfaces engage each other, the cover fixes the top plate of the first coupling element relative to the seat surface.

In an embodiment of the present invention, the second fixing device comprises a slide rail that is formed on the outer surface of each sidewall portion and is fitted to an inner surface of the side plate of the second coupling element. The second coupling element may include a stopper portion protruding from the lower end of each side plate. The second fixing device may further comprise: a stopper protruding from a front end of the slide rail and configured to abut a front end of the stopper portion; and a latching lever formed at the rear end of one of the sidewall portions and configured to elastically latch a rear end of the stopper portion.

In an embodiment of the present invention, the third fixing device comprises: a bearing aperture formed in each sidewall portion so as to be located in an axis parallel to the axis extending through the pivot holes, the side pin of the third coupling element being insertable to the bearing aperture, and the outer surface of one of the sidewall portions, the clip arm snap-engaging the outer surface. The adaptor may include a cover pivotally attached to the sidewall portions in a direction perpendicular to the axis extending through the pivot holes. The cover may have a portion which a portion of the third coupling element contact.

In an embodiment of the present invention, the frame has a pair of notches at opposed edges. The bracket includes a pair of holding claws and an engaging protrusion at each of lower opposed edges. The edges of the frame reside on the holding claws and the notch and the engaging protrusion engage each other.

A further aspect relates to a flat wiper blade commonly applicable to the various types of wiper arms. In an exemplary embodiment, the flat wiper blade comprises: a wiper strip; a frame configured to hold and support the wiper strip; first and second spoilers configured to be joined to the frame by fitting engagement; and the above-described connecting unit coupled to the frame between the first and second spoilers. The first spoiler and the bracket of the connecting unit engage each other and the second spoiler and the bracket engage each other.

The flat wiper blade according to embodiments can be connected to the various types of wiper arms by means of the connecting unit that is commonly applicable to the various types of wiper arms. The connecting unit is coupled to the first coupling element in such a manner that the cover fixes the front end portion of the first coupling element and the pivot pins support the connecting unit at the rear end of the first coupling element, thereby achieving a simple and firm coupling between the connecting unit and the wiper arm with the first coupling element. Further, the connecting unit is connected to the wiper arm so as not to exert force to the coupled portion between the connecting unit and the coupling element in a movement direction of the wiper arm, thereby avoiding separation of the flat wiper blade from the wiper arm during the operation of the wiper arm. Moreover, the adaptor is mounted on the bracket in such a manner that the both ends of the pivot shaft are snap-engaged or fitted to the pivot holes, thereby providing a free pivoting motion and a simple and rapid coupling between the bracket and the adaptor. Additionally, two pivot axes of the side pin and the pivot shaft are provided between the connecting unit and the third coupling element, thus achieving stable pivot structure therebetween. Further, the flat wiper blade according to the embodiments has a configuration with its spoilers integrated thereto since the connecting unit and the spoilers are engaged to one another.

DETAILED DESCRIPTION

Figure 1:
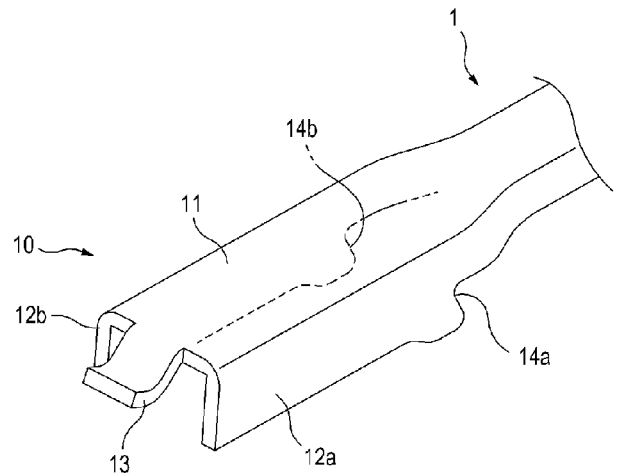
FIG. 1 is a perspective view showing a top lock wiper arm.
Figure 2:
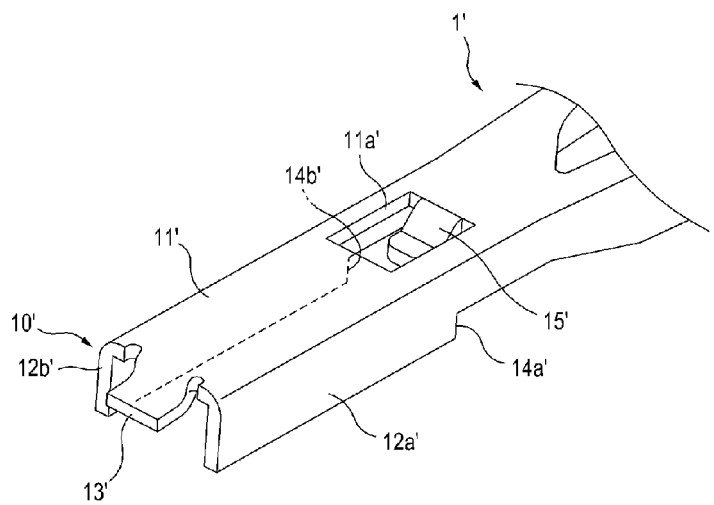
FIG. 2 is a perspective view showing another top lock wiper arm.
Figure 3:
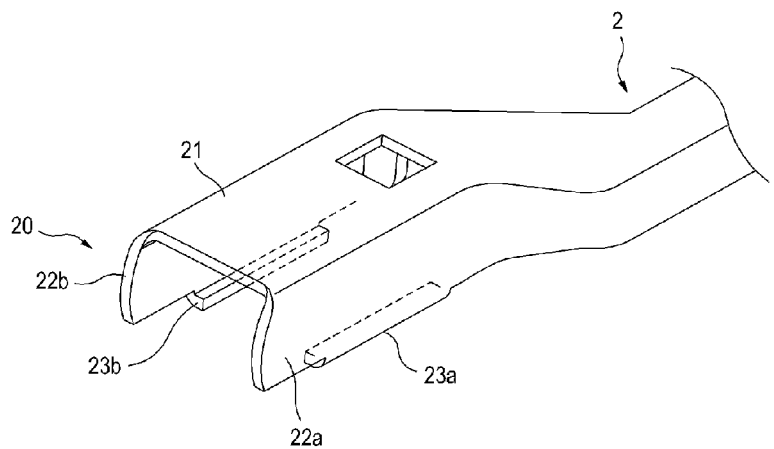
FIG. 3 is a perspective view showing a bayonet wiper arm.
Figure 4:
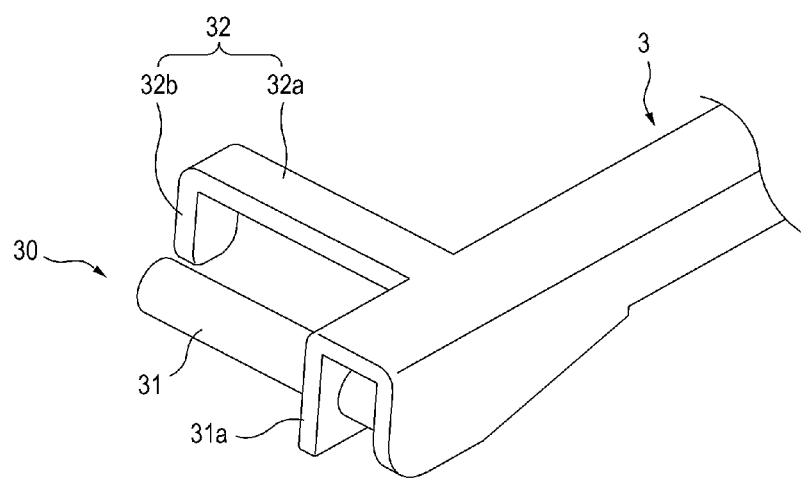
FIG. 4 is a perspective view showing a side lock wiper arm.

Embodiments of a flat wiper blade and embodiments of a connecting unit for connecting a flat wiper blade to various types of wiper arms are described more fully with reference to the accompanying drawings. Like reference numerals in the drawings refer to like elements or parts.

As used herein, the directional term "upper," "upward" or the like is generally based on an orientation, with which a bracket is placed relative to a frame bar in the drawings, while the directional term "lower," "downward" or the like generally refers to a direction opposite to the upward or upper direction. A flat wiper blade shown in the accompanying drawings may be otherwise oriented (e.g., rotated 180 degrees or at other orientations) and the aforementioned directional terms may be interpreted accordingly. Further, as used herein, the directional term "forward," "front" or the like generally refers to a direction away from a wiper arm in a longitudinal direction of the wiper arm, while the directional term "backward," "rearward," "rear" or the like generally refers to a direction opposite to the forward or front direction.

A flat wiper blade according to exemplary embodiments is constructed to be applicable to various types of wiper arms. For such purpose, the flat wiper blade comprises a connecting unit having an adaptor that is suitable for all of the coupling elements provided at free or distal ends of the wiper arms.

With reference to FIGS. 1 to 4, first to third coupling elements 10, 10', 20, 30 provided at distal ends of wiper arms, to which the flat wiper blade according to embodiments may be connected, will be first described.

A first coupling element 10 includes a top plate 11 and a pair of side plates 12a, 12b extending from both lateral edges of the top plate 11, thereby forming an inverted U-shape and defining a receiving space therein, in which the adaptor may be received. The top plate 11 contacts a top of the adaptor at its lower surface. The side plates 12a, 12b face to lateral sides of the adaptor respectively. Further, the first coupling element 10 includes the following: a tab or tongue 13 extending from a front end of the top plate 11; and concave portions 14a, 14b formed in such a manner that rear ends of the side plates 12a, 12b are cut away in part or that the rear ends of the side plates 12a, 12b are recessed inward in part.

Another first coupling element 10' is configured similarly to the first coupling element 10, except that an aperture 11a is provided in a top plate 11', another tab or tongue 15' extends forward from an edge of the aperture 11a and concave portions 14a, 14b' are formed at a right angle. Some example of the first coupling element 10' may not include said another tongue 15'.

A second coupling element 20 includes a top plate 21 and side plates 22a, 22b vertically extending from both lateral edges of the top plate 21, thereby forming an inverted U-shape and defining an insertion space therein, to which the adaptor may be fitted. Further, the second coupling element 20 includes a stopper portion 23a, 23b protruding inward from a lower edge of each of the side plates 22a, 22b. The stopper portion 23a, 23b is located between a middle portion and a rear end of the side plate 22a, 22b.

A third coupling element 30 includes a side pin 31 perpendicularly extending from a distal end of a wiper arm 3 and a clip arm 32 extending adjacent to the side pin 31 parallel thereto. The clip arm 32 includes a stopper section 32a and a clip section 32b bent downwardly and extending from a distal end of the stopper section 32a.

The connecting unit of the flat wiper blade is constructed to separably connect a flat wiper blade to wiper arms 1, 1', 2, 3, which has one of the differently-configured first to third coupling elements 10, 10', 20, 30 at its distal end. For purposes of such connection, the connecting unit includes first to third fixing devices that carry out fixing to the respective first to third coupling elements. The first fixing device carries out fixing of hanging between the adaptor and the first coupling element 10, 10'. The second fixing device carries out fixing of fitting between the adaptor and the second coupling element 20. The third fixing device carries out fixing of inserting and then pivoting between the adaptor and the third coupling element 30.

Figure 5:
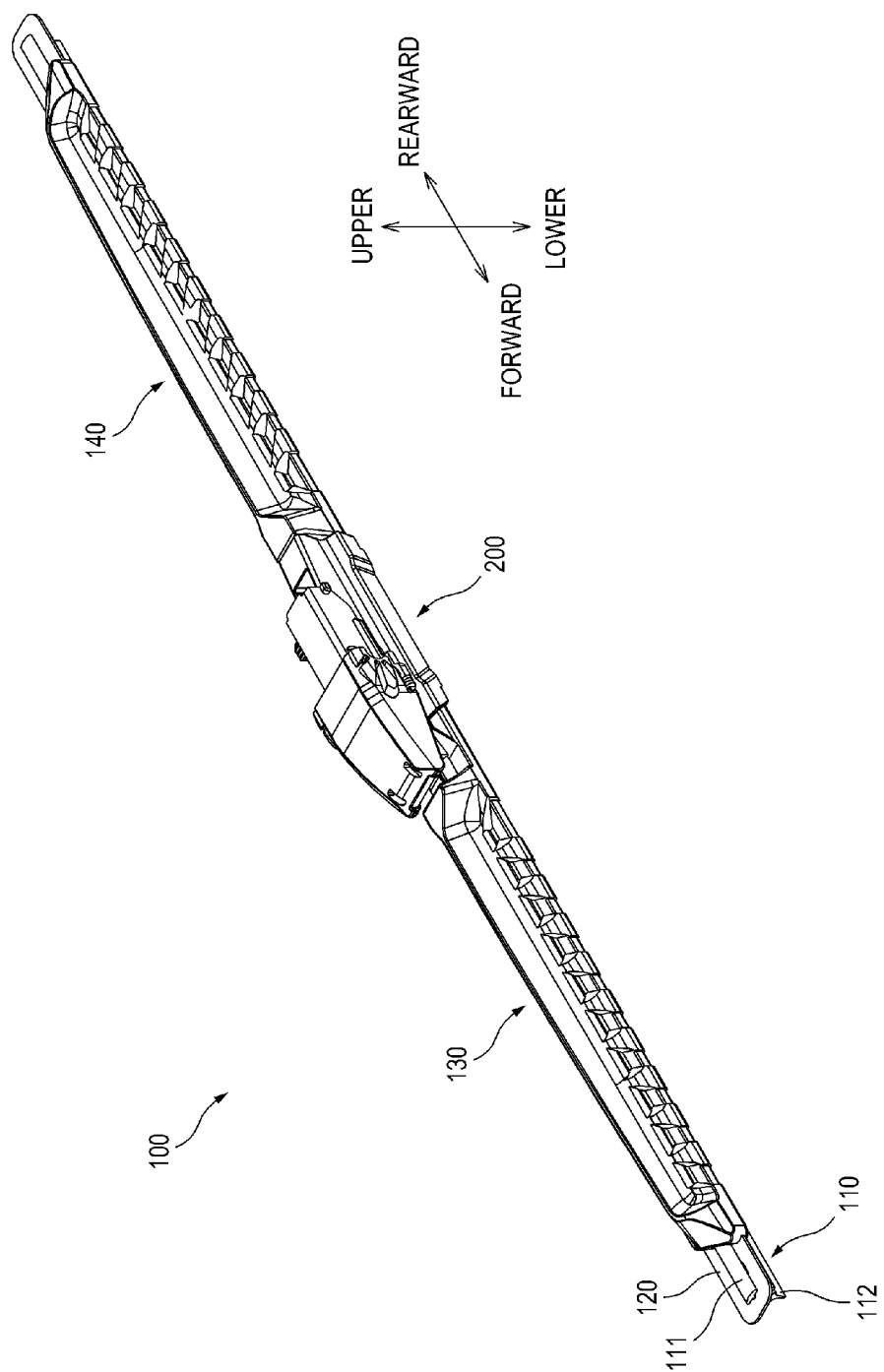
FIG. 5 is a perspective view showing a flat wiper blade according to one embodiment.
Figure 6:
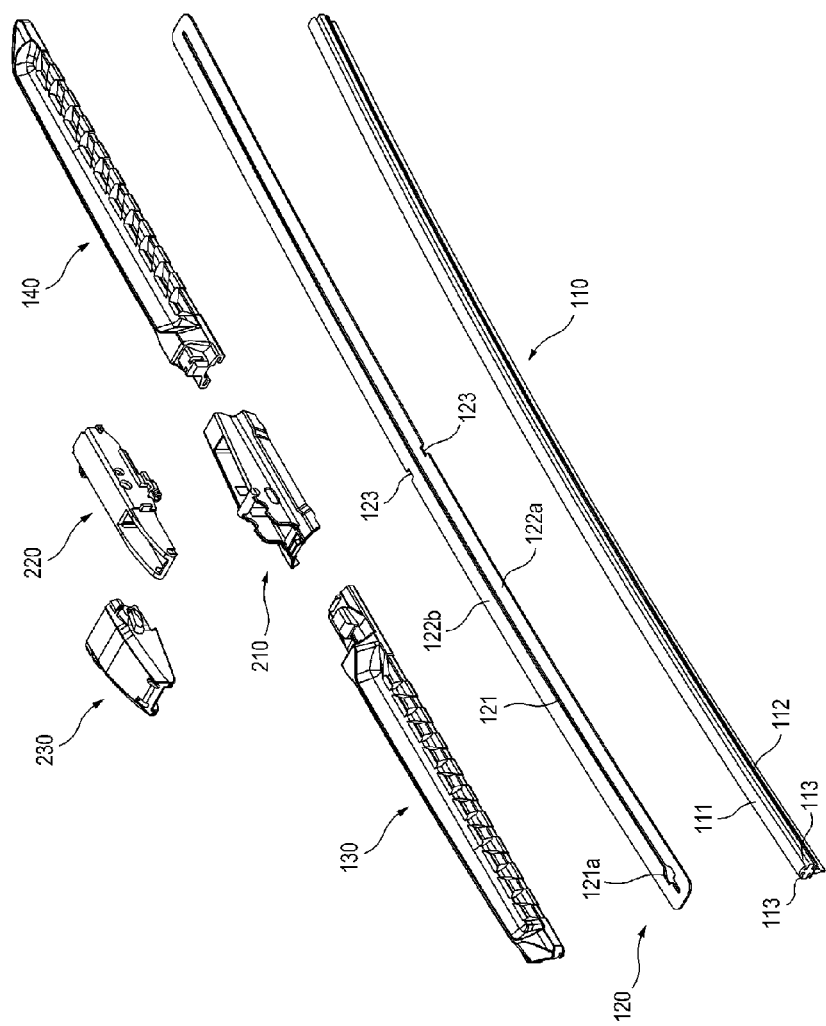
FIG. 6 is an exploded perspective view showing the flat wiper blade shown in FIG. 5.
Figure 7:
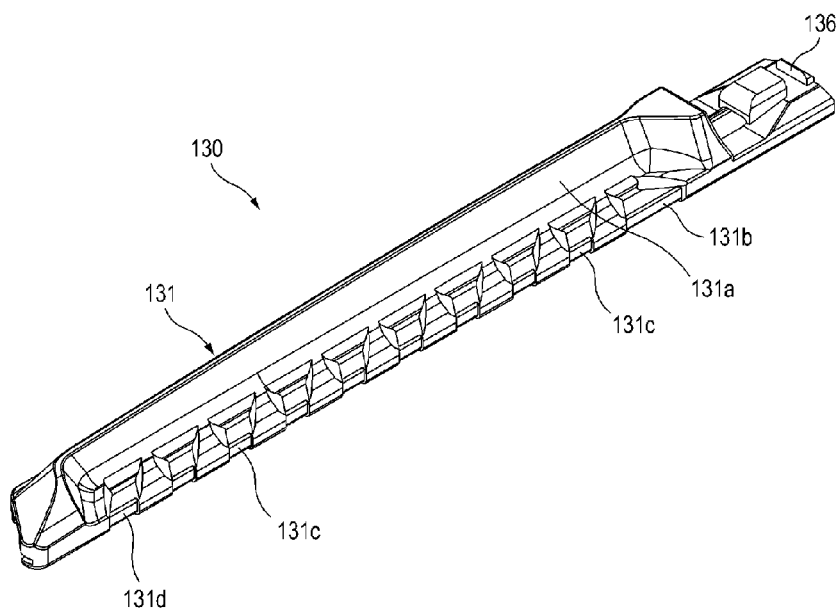
FIG. 7 is a perspective view of a first spoiler.
Figure 8:
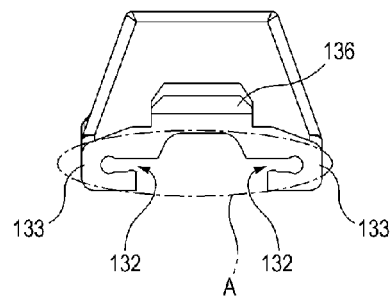
FIG. 8 is an end view of a base end of the first spoiler.
Figure 9:
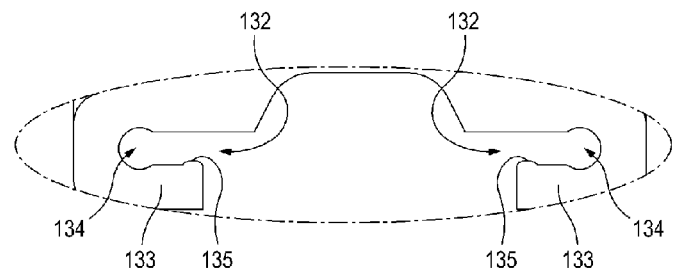
FIG. 9 is an enlarged view of a portion A in FIG. 8.
Figure 10:
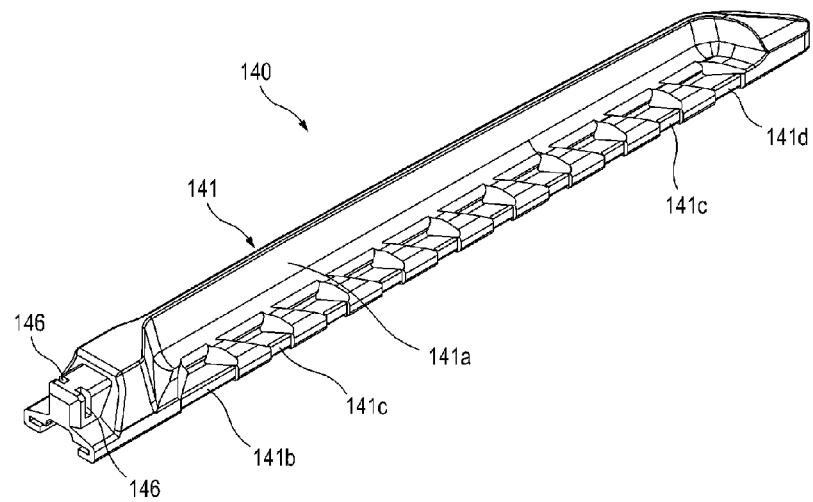
FIG. 10 is a perspective view of a second spoiler.
Figure 11:
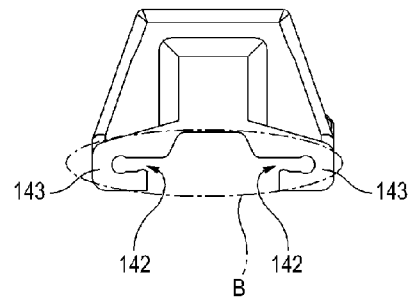
FIG. 11 is an end view of a base end of the second spoiler.
Figure 12:
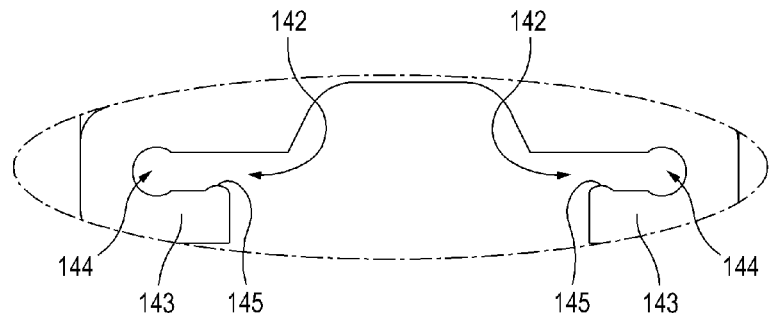
FIG. 12 is an enlarged view of a portion B in FIG. 11.
Figure 13:
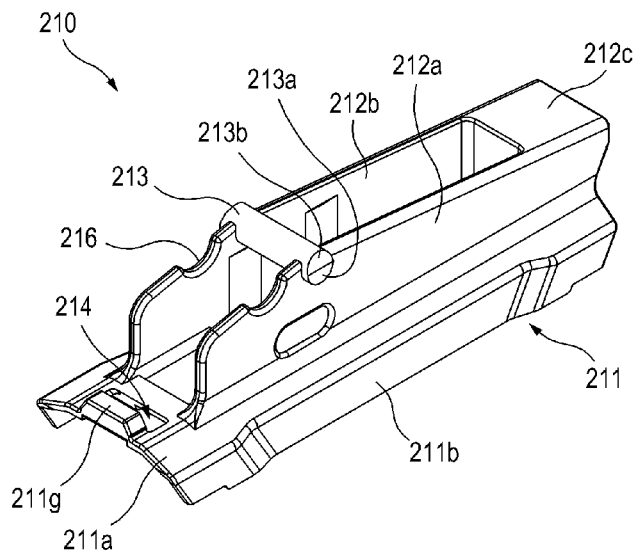
FIG. 13 is an upper perspective view of a bracket.
Figure 14:
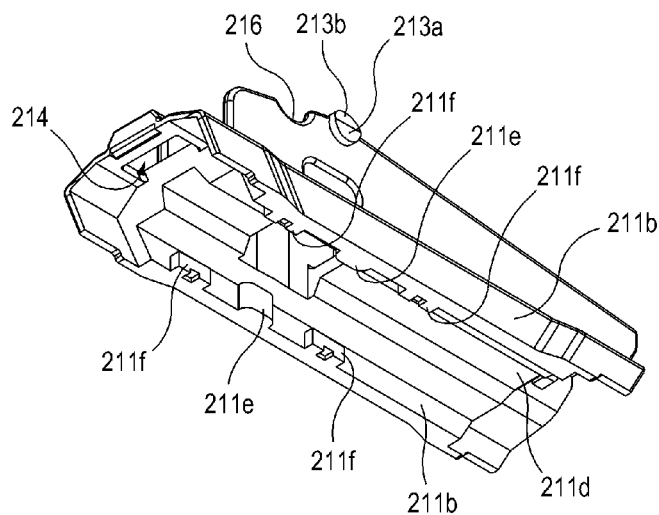
FIG. 14 is a lower perspective view of the bracket.
Figure 15:
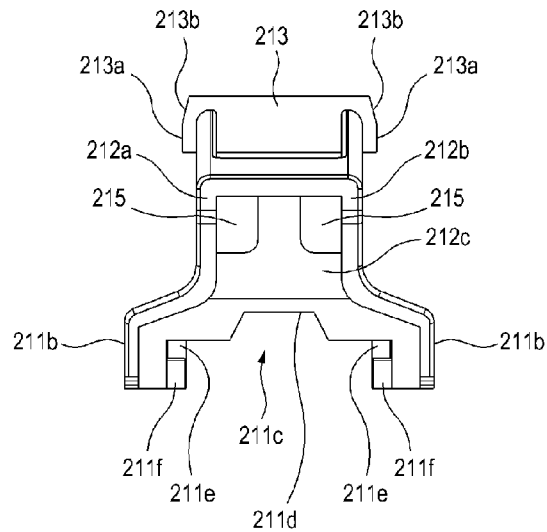
FIG. 15 is a rear view of the bracket.
Figure 16:
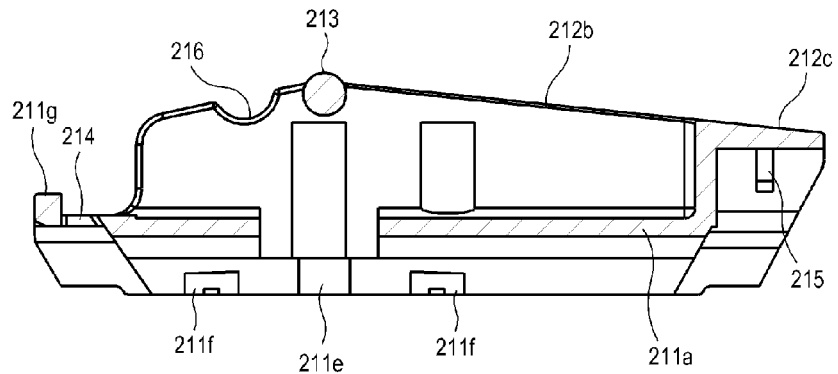
FIG. 16 is a longitudinally sectional view of the bracket.

Referring to FIGS. 5 and 6, in one exemplary embodiment, a flat wiper blade 100 includes the following: a wiper strip 110; a single elongated frame (a frame bar 120) for holding and supporting the wiper strip; and a connecting unit 200 positioned on the frame bar 120 for separably connecting an assembly of the wiper strip 110 and the frame bar 120 to the wiper arms. In one embodiment, the connecting unit 200 includes the following: a bracket 210 fixed to the frame bar 120; an adaptor 220 pivotally mounted on the bracket 210; and a cover 230 attached to the adaptor 220.

The wiper strip 110 may be made from, for example, a rubber or an elastomer material. The wiper strip 110 has a head portion 111, which extends longitudinally and is placed on the frame bar 120, at its upper end and a wiper lip 112, which extends longitudinally and contacts a surface of a windshield, at its lower end. The wiper strip 110 has a pair of grooves 113 for coupling to the frame bar 120 beneath the head portion 111. The grooves 113 extend in a longitudinal direction of the wiper strip 110.

The frame bar 120 functions as a frame of the flat wipe blade 100. The frame bar 120 fixes and supports the wiper strip 110 in the longitudinal direction thereof. The frame bar 120 has a shape of a thin and elongated bar. The frame bar 120 may be made from a metallic or plastic material. The frame bar 120 may be curved with a certain curvature as shown in FIG. 6. Alternatively, the frame bar may be formed without any curvature.

The frame bar 120 has a slot 121 formed along a longitudinal direction of the frame bar. The slot 121 extends from the proximity of a front end of the frame bar 120 to the proximity of a rear end of the frame bar. The frame bar 120 has a first half section 122a and a second half section 122b with respect to the slot 121. A triangular insertion inlet 121a is formed at one end of the slot 121. Since the frame bar 120 has the slot 121 formed along its longitudinal center line, if forces are applied to both longitudinal edges of the frame bar 120 inwardly of the frame bar, then each half section 122a, 122b of the frame bar 120 can flex or curve inwardly. Further, the frame bar 120 has a notch 123 at either edge in the middle section. The notches 123 are concave inwardly from an outer edge of each half section 122a, 122b. The notches 123 participate in engagement to the bracket 210 of the connecting unit 200. The wiper strip 110 may be affixed to the frame bar 120 by inserting its one end to the insertion inlet 121a and then fitting in along the slot 121 of the frame bar 120. Specifically, the wiper strip 110 may be joined to the frame bar 120 by inserting one end portion of the head portion 111 to the insertion inlet 121a and then fitting a portion between the grooves 113 into the slot 121. When the wiper strip 110 is joined to the frame bar 120, the head portion 111 of the wiper strip 110 protrudes on an upper surface of the frame bar 120.

Further, in this embodiment, the flat wiper blade 100 has a first spoiler 130 and a second spoiler 140, which are joined to the frame bar 120 in front and rear of the bracket 210 respectively. The first and second spoilers 130, 140 are fixed to the frame bar 120 along the longitudinal direction of the frame bar through fitting of the frame bar into the spoilers. Further, the first and second spoilers 130, 140 are coupled to the bracket 210 through engagement therebetween. The first and second spoilers 130, 140 react on wind or air stream impinging on the flat wiper blade 100 during running of a vehicle, thereby producing a reaction force preventing the flat wiper blade 100 from rising up.

The first and second spoilers 130, 140 may be made from a rubber material. The first and second spoilers 130, 140 have a symmetrical shape except for a portion to be coupled to the bracket 210 of the connecting unit 200.

As shown in FIGS. 7 to 12, the first and second spoilers 130, 140 have vane portions 131, 141 that are symmetrically shaped. The vane portion 131, 141 is elongated and extends from the proximity of the base end (an end facing toward the bracket 210) of each spoiler 130, 140 to a distal end of each spoiler. The vane portion 131, 141 has a concave surface 131a, 141a, which is concave inwardly of the vane portion, at a portion where wind or air stream comes in. The concave surface 131a, 141a is concave in both lateral and longitudinal directions of the vane portion 131, 141. The concave surface 131a, 141a extends from the proximity of the base end of the spoiler 130, 140 to the distal end of the spoiler along the vane portion 131, 141. The concave surface 131a, 141a concave toward the inside of the vane portion increases the reaction force from the reaction against the wind or air stream coming to the vane portion 131, 141 during running of a vehicle, thus enhancing the anti-lift effect. Further, the vane portion 131, 141 has a plurality of indents 131b, 131c, 131d, 141b, 141c, 141d for increasing the reaction against the wind or air stream. The indents 131b, 131c, 131d, 141b, 141c, 141d are located in a lateral edge (a leading edge) of the concave surface 131a, 141a. The indents 131b, 131c, 131d, 141b, 141c, 141d are arranged along the leading edge at equal or predetermined spacing. The vane portion may have a profile different from the above-described profile. By way of example, the vane portion may have a streamline cross-section such as a circular arc shape. Further, such a cross-section may become gradually smaller from the base end of each spoiler toward the distal end.

The first and second spoilers 130, 140 have a pair of fitting grooves 132, 142, to which the half sections 122a, 122b of the frame bar 120 are inserted and fitted respectively. The fitting grooves 132, 142 longitudinally extend from the base end of each spoiler to the distal end underneath the vane portion 131, 141. In this embodiment, the first and second spoilers 130, 140 have a pair of holders 133, 143 for fitting of the frame bar 120. The holders 133, 143 have a hook-shaped cross section. The holders 133, 143 extend along either lower lateral edge of the spoiler. The fitting grooves 132, 142 are formed in a portion of the holder 133, 143, which face the inside of the spoiler. Further, the first and second spoilers have round grooves, chamfer grooves or receiving grooves 134, 144 in an innermost portion of the fitting grooves 132, 142. The receiving grooves 134, 144 extend along the fitting grooves 132, 142 and receive the lateral edges of the frame bar 120. The receiving grooves 134, 144 have a circular or oval cross section. A width or diameter of the receiving groove 134, 144 is greater than a width of the fitting groove 132, 142 (a distance between an upper surface and a lower surface of the fitting groove). Right-angled corners in the edge of the frame bar 120 contact an inner rounded surface of the receiving groove 134, 144. Thus, the fitting grooves 132, 142 do not have points or portions on which stresses or forces concentrate, thus enhancing durability of the first and second spoilers 130, 140. Further, the first and second spoilers 130, 140 have pressing ridges 135, 145 that protrude on a lower surface of the fitting groove 132, 142 and extend along the fitting groove 132, 142. The pressing ridges 135, 145 allow the fitting groove 132, 142 to receive frame bars having different thicknesses. Further, the pressing ridges 135, 145 allow the frame bar 120 to be closely fitted to the fitting grooves 132, 142.

The bracket 210 and the first and second spoilers 130, 140 of the flat wiper blade 100 have an element for interlock therebetween. Said element may comprise a first element and a second element which complementarily engage each other. The first element is provided in the bracket 210, while the second element is provided in each of the first and second spoilers 130, 140. In this embodiment, the second element includes a latching claw 136 formed in the base end of the first spoiler 130 and a pair of latching grooves 146 formed in the base end of the second spoiler 140.

Referring back to FIGS. 5 and 6, as described above, the connecting unit 200 is configured to separably connect the assembly comprised of the wiper strip 110 and the frame bar 120 (or, an assembly comprised of the wiper strip 110, the frame bar 120 and the first and second spoilers 130, 140) to various types of wiper arms 1, 1', 2, 3. The connecting unit 200 includes the following: the bracket 210 fixed to the frame bar 120; the adaptor 220 pivotally mounted on the bracket 210; and the cover 230 pivotally attached to the adaptor 220 and participating in lock between the adaptor and the wiper arm.

Descriptions will be made as to the bracket 210 with reference to FIGS. 13 to 16. The bracket 210 serves as a base on which the adaptor 220 is mounted. The bracket 210 functions to hold the frame bar 120 during operation of the wiper arms. The bracket 210 is disposed in a midway portion of the frame bar 120. For example, the bracket 210 is joined to the frame bar 120 in such a manner that a part of the bracket 210 engages the edge of the frame bar 120 and holds the edge portion of the frame bar 120.

The bracket 210 includes the following: a holder 211 configured to substantially cover up the frame bar 120 in a lateral direction of the frame bar; a pair of support wall portions 212a, 212b vertically formed on the holder 211; and a pivot shaft 213 disposed at an upper end of the support wall portions 212a, 212b with a portion thereof protruding on the upper end.

The holder 211 has a generally fork-like cross section. The holder 211 has a base portion 211a placed on the frame bar 120 and a pair of leg portions 211b extending downwardly from lateral edges of the base portion 211a. A distance between the leg portions 211b is equal to or somewhat smaller than the width of the frame bar 120. The frame bar 120 is positioned in a space 211c defined by the base portion 211a and the leg portions 211b. A groove or recess 211d longitudinally extends on an underside of the base portion 211a. The groove 211d functions to receive the head portion 111 of the wiper strip 110 appearing on the frame bar 120. The bracket 210 has engaging protrusions 211e protruding from lower edges of the leg portions 211b toward the space 211c. The engaging protrusion 211e is shaped to corresponding to the notch 123 formed in the frame bar 120. Further, the holder 211 has holding claws 211f protruding from the leg portions 211b toward the space 211c. The holding claws 211f is disposed on the lower edges of the leg portions 211b with the engaging protrusion 211 therebetween. The edge portion of the frame bar 120 is situated on top of the holding claws 211f. One side of the holding claw 211f facing toward the engaging protrusion 211e is higher than the opposite side thereof. When assembling the frame bar 120 and the bracket 210 together, one of the notches 123 of the frame bar 120 is first engaged to the engaging protrusion 211e as the half sections 122a, 122b of the frame bar 120 are closed to each other. Then, a portion adjacent to the notch 123 is pushed in between the base portion 211a and the holding claws 211f. Thereafter, the other half section of the frame bar 120 is fully pushed into the space 211c and the force exerted to each half section of the frame bar 120 is removed. Then, each half section reverts to its initial position due to elasticity of the frame bar 120 and thus the frame bar 120 is fully situated within the space 211c. When the frame bar 120 and the bracket 210 are assembled to each other, the engaging protrusions 211e of the bracket 210 and the notches 123 are in engagement with each other. Thus, the frame bar 120 and the bracket 210 are fixed in the longitudinal direction of the frame bar 120. Further, when assembled, each half section 122a, 122b of the frame bar 120 is placed between the lower surface of the base portion 211a and the upper surfaces of the holding claws 211f with a little play or gap therebetween. Thus, the frame bar 120 and the bracket 210 are fixed in a direction perpendicular to the longitudinal direction of the frame bar 120.

The support wall portions 212a, 212b are formed parallel to each other on the base portion 211a of the holder 211. A distance between the support wall portions 212a, 212b is less than a width of the base portion 211a. Further, rear edges of the support wall portions 212a, 212b are continued to a rear edge of the holder 211, while front edges of the support wall portions are not continued to a front edge of the holder 211. That is, when viewing the bracket 210 sideways, the rear edges of the holder 211 and the support wall portions 212a, 212b are in a line, whereas the front edge of the support wall portions 212a, 212b is spaced rearward from the front edge of the holder 211. Accordingly, the bracket 210 is configured such that its forward portion is lower than its rearward portion, thereby increasing a pivoting range of the adaptor 220 on its forward portion. Further, a bridge portion 212c is formed in the rear end portion of the support wall portion 212a, 212b. The bridge portion 212c is angularly bent.

The pivot shaft 213 extends on top of the support wall portions 212a, 212b with an orientation substantially perpendicular to the longitudinal direction of the frame bar 120.

Both lateral ends 213a of the pivot shaft 213 slightly protrude outwardly of the support wall portions 212a, 212b. The both lateral ends 213a of the pivot shaft 213 have a beveled surface 213b to facilitate mounting the adaptor 220. The pivot shaft 213 is fitted to the adaptor 220, thereby joining the adaptor 220 to the bracket 210. The pivot shaft 213 serves as a pivot center of the flat wiper blade 100 with respect to the wiper arm 1, 1', 2, 3.

Semicircular notches 216 are formed in the upper edges of the support wall portions 212a, 212b in front of the pivot shaft 213 respectively. The notches 216 permits passage of the side pin 31 of the third coupling element 30 and prevents interference between the side pin 31 and the support wall portions 212a, 212b.

In this embodiment, the bracket 210 has a slot and an engaging rib as the first element for securing the first and second spoilers 130, 140 to the bracket 210. Specifically, the bracket 210 has a slot 214 in the vicinity of a front end portion of the base portion 211a, in which the support wall portions 212a, 212b do not exist. The slot 214 extends perpendicularly to the longitudinal direction of the frame bar 120. A catch protrusion 211g is formed at the front end of the base portion 211a adjacent to the slot 214. Further, the bracket 210 has a pair of engaging ribs 215 in the bridge portion 212c at the rear end portion.

Figure 17:
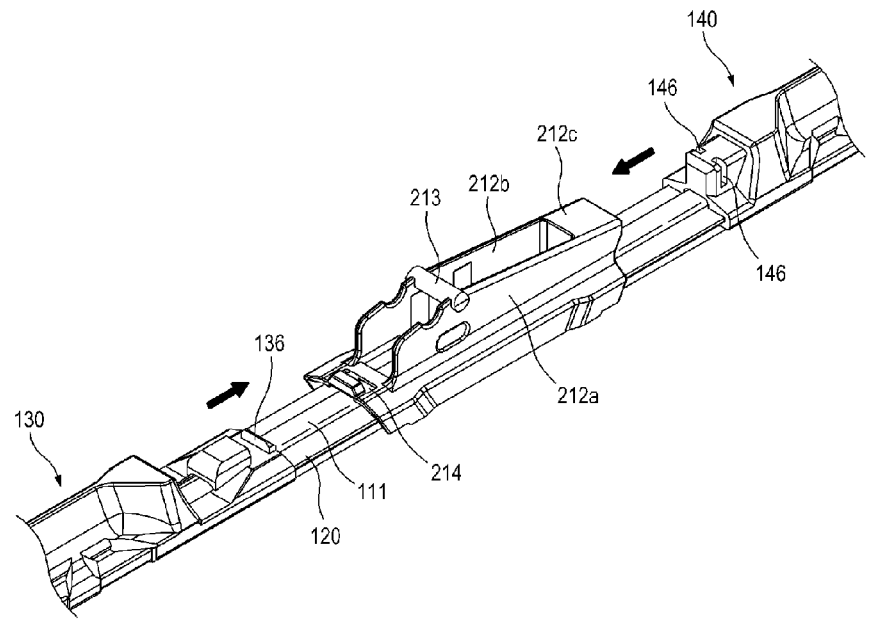
FIG. 17 is a perspective view showing a coupling between the bracket and the first and second spoilers.
Figure 18:
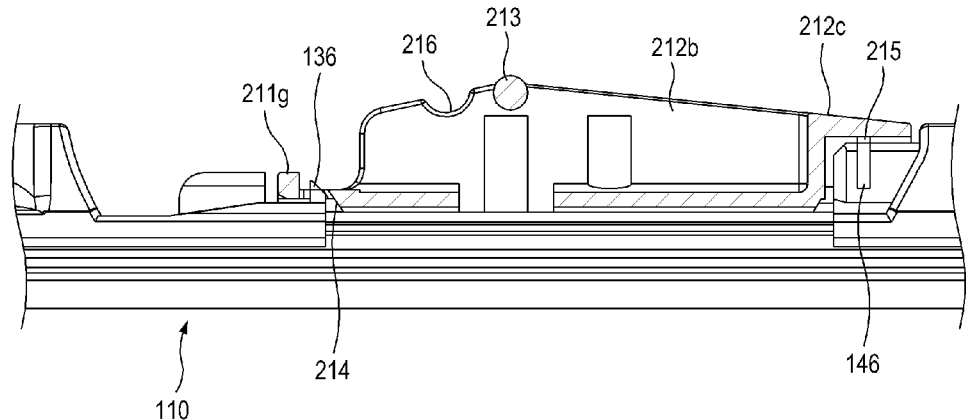
FIG. 18 is a sectional view showing a coupled configuration between the bracket and the first and second spoilers.
Figure 19:
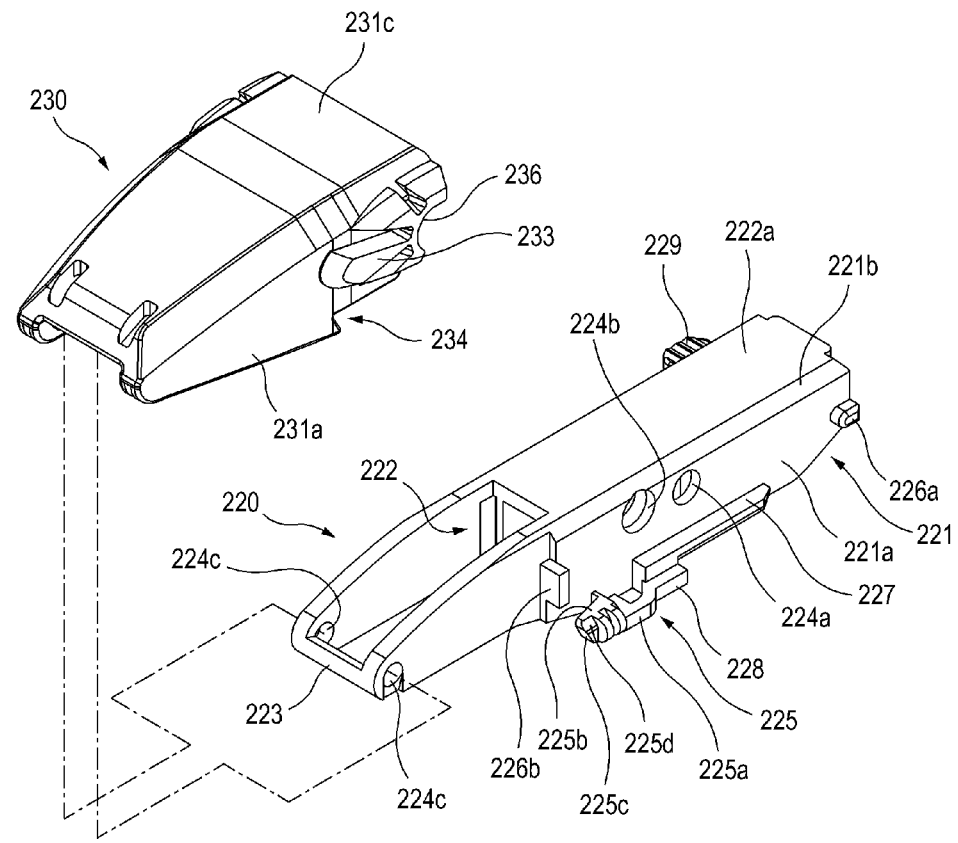
FIG. 19 is an upper perspective view of an adaptor and a cover.
Figure 20:
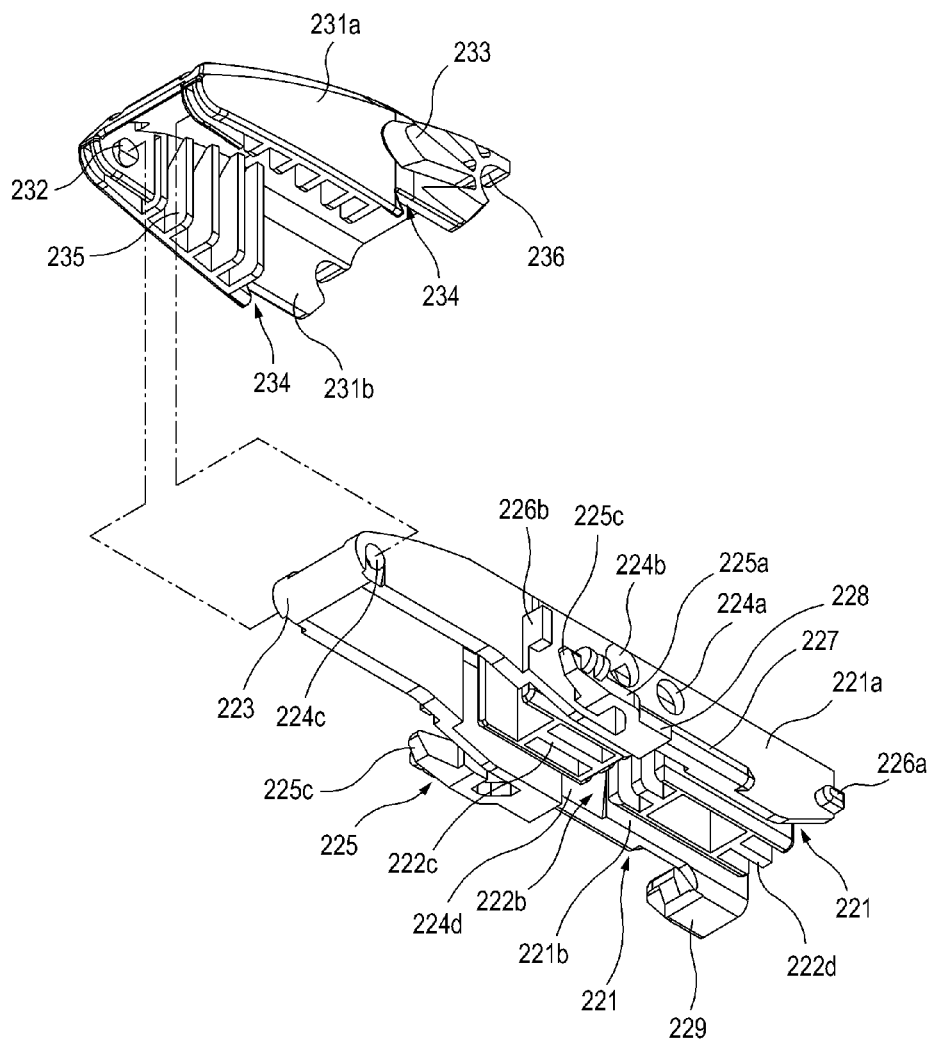
FIG. 20 is a lower perspective view of the adaptor and the cover.
Figure 21:
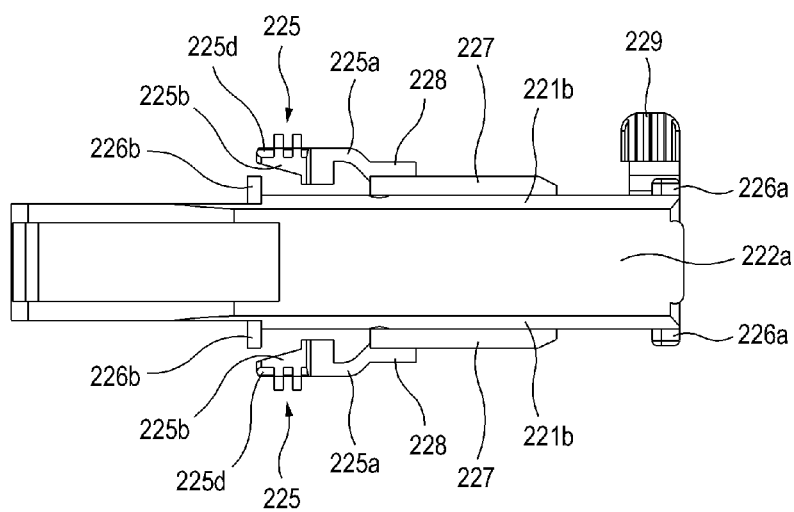
FIG. 21 is a plan view of the adaptor.
Figure 22:
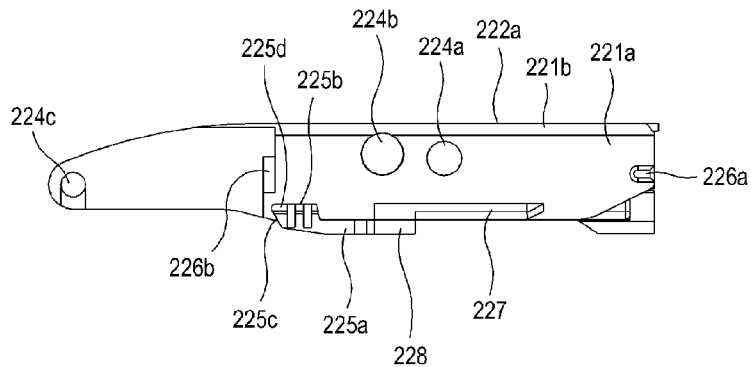
FIG. 22 is a right side view of the adaptor.
Figure 23:
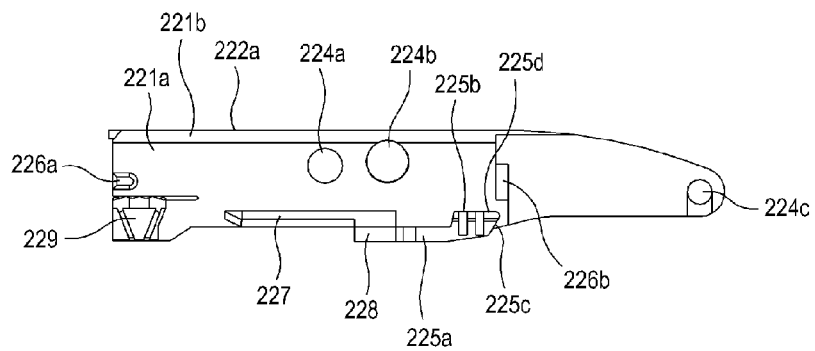
FIG. 23 is a left side view of the adaptor.
Figure 24:
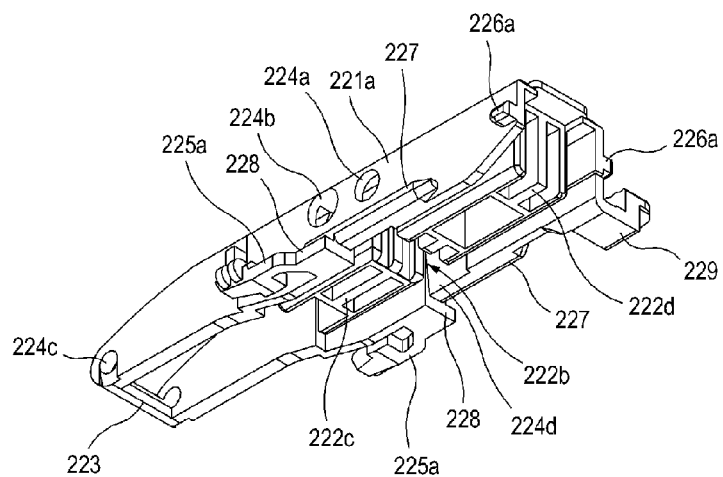
FIG. 24 is a lower perspective view of the adaptor.
Figure 25:
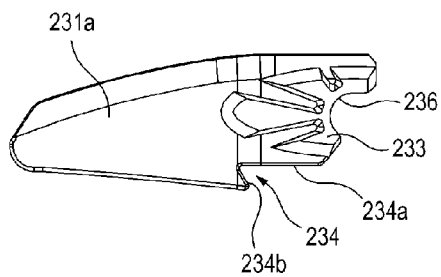
FIG. 25 is a right side view of the cover.
Figure 26:
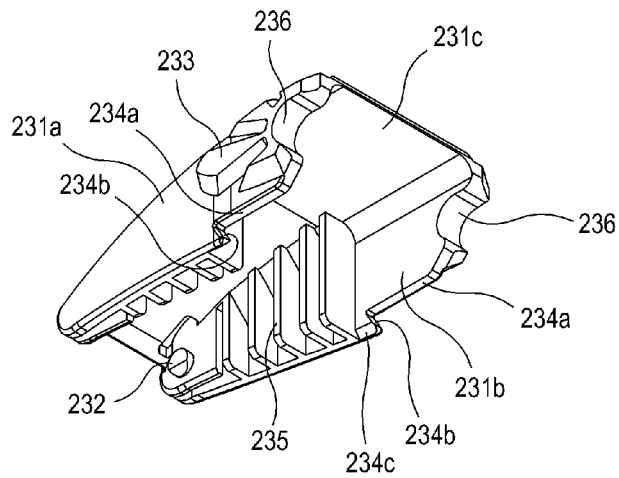
FIG. 26 is a lower perspective view of the cover.
Figure 27:
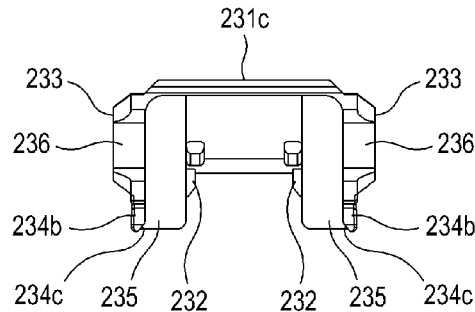
FIG. 27 is a rear view of the cover.

As shown in FIG. 18, when the first and second spoilers 130, 140 and the bracket 210 are coupled to one another, the slot 214 is in engagement with the latching claw 136 of the first spoiler 130 and the engaging ribs 215 are in engagement with the latching grooves 146 of the second spoiler 140. As shown in FIG. 17, the frame bar 120 is fitted to the fitting grooves 132 of the first spoiler 130. Then, the base end of the first spoiler 130 abuts the front end of the bracket 210. If the first spoiler 130 is further pushed to the bracket 210, then the latching claw 136 is fitted to or engages the slot 214 to lock the first spoiler 130 and the bracket 210 to each other. Further, the frame bar 120 is fitted to the fitting grooves 142 of the second spoiler 140. Then, the base end of the second spoiler 140 abuts the rear end of the bracket 210. If the second spoiler 140 is further pushed to the bracket 210, then the engaging ribs 215 are fitted to or engage the latching grooves 146 to lock the second spoiler 140 and the bracket 210 to each other.

Descriptions will be made as to the adaptor 220 and the cover 230 with reference to FIGS. 19 to 27.

The adaptor 220 is pivotally mounted on the bracket 210. The adaptor 220 includes a pair of sidewall portions 221 and first and second bridge portions 222, 223 connecting the sidewall portions 221 to each other. A portion of the bracket 210 including the pivot shaft 213 is situated between the sidewall portions 221.

Pivot holes 224a, to which lateral ends 213a of the pivot shaft 213 are fitted respectively, are provided in the sidewall portions 221 respectively. In this embodiment, the pivot holes 224a are formed through the sidewall portions 221. In some embodiment, pivot holes may be formed on inner surfaces of the sidewall portions 221 with a depth not perforating the sidewall portions. A distance between the inner surfaces of the sidewall portions 221 is slightly greater than a distance between outer surfaces of the support wall portions 212a, 212b of the bracket 210.

The first bridge portion 222 extends between the sidewall portions 221 from the rear ends of the sidewall portions 221 to an approximate middle portion. Only the sidewall portion 221 is between the first bridge portion 222 and the second bridge portion 223 and the tongue 13, 13' of the first coupling element 10, 10' is situated therebetween. A top surface of the first bridge portions 222 is plane and functions as a seat surface 222a on which the top plate 11, 11' of the first coupling element 10, 10' and the clip arm 32 of the third coupling element 30 are seated. The seat surface 222a is flush with edges of upper ends 221b of the sidewall portions 221. In some embodiment, the top surface of the first bridge portion 222 may be formed lower than the upper ends 221b of the sidewall portions 221. In such a case, the top plate 11, 11' of the first coupling element 10, 10' and the clip arm 32 of the third coupling element 30 are seated on the upper ends 221b of the sidewall portions 221.

The first bridge portion 222 has a first insertion section 222c and a second insertion section 222d at its underside. The first and second insertion sections 222c, 222d are situated between the support wall portions 212a, 212b of the bracket 210 with the pivot shaft 213 interposed between the first and second insertion sections, thus preventing the adaptor 220 from shaking transversely relative to an axis of the pivot shaft 213. The first bridge portion 222 defines an insertion cavity 222b between the first and second insertion sections 222c, 222d at its underside. The insertion cavity 222b communicates with the pivot holes 224a. A guide surface 224d is formed on each inner surface of the sidewall portion 221 facing toward the insertion cavity 222b from the lower end of the sidewall portion to the pivot hole 224a. The guide surfaces 224d are inclined outwardly of the sidewall portions 221.

When the adaptor 220 is mounted on the bracket 210, the pivot shaft 213 is brought in contact with the guide surfaces 224d in the lower ends of the sidewall portions 221 at the beveled surfaces 213b of the lateral ends thereof. As the adaptor 220 is pressed down toward the bracket 210, the lateral ends of the pivot shaft 213 approach the pivot holes 224a along the guide surfaces 224d, while the sidewall portions 221 are elastically curved or warped outwardly of the adaptor 220. Then, if the lateral ends of the pivot shaft 213 are fully inserted into the pivot holes 224a, the sidewall portions 221 elastically return, and thus, the lateral ends 213a of the pivot shaft 213 are fitted to their respective pivot holes 224a. When the adaptor 220 is completely mounted on the bracket 210, the lateral ends of the pivot shaft 213 is flush with or inner than the outer surfaces of the sidewall portions 221. As described above, by pressing the adaptor 220 toward the bracket 210 from above and snap-engaging the pivot shaft 213 and the pivot holes 224a, the adaptor 220 is mounted on the bracket 210.

The pivot shaft 213 is oriented perpendicularly to the frame bar 120 and the wiper arms are coupled to the adaptor 220 parallel to the frame bar 120. Thus, when the flat wiper blade 100 is connected to the wiper arm 1, 1', 2, 3, an assembly comprised of the wiper strip 110, the frame bar 120 and the first and second spoilers 130, 140 can rotate clockwise or counterclockwise around the pivot shaft 213 within a certain angular range. Accordingly, when the flat wiper blade 100 is moved on the windshield surface by the wiper arm 1, 1', 2, 3, the flat wiper blade 100 can be placed in close contact with the windshield surface in conformance with a curvature of the windshield surface.

The second bridge portion 223 is disposed at front ends of the sidewall portions 221. Apertures 224c for pivotally attaching the cover 230 are formed in the respective sidewall portions 221 adjacent to the second bridge portion 223.

The adaptor 220 of the connecting unit 200 is fixed to the first coupling element 10, 10' via the first fixing device. The first fixing device fixes the side plates 12a, 12b, 12a, 12b' of the first coupling element 10, 10' to the outer surfaces 221a of the sidewall portions 221 of the adaptor. Further, the first fixing device fixes a portion of the top plate 11, 11' of the first coupling element 10, 10' relative to the upper ends 221b (the seat surface 222a of the first bridge portion 222) of the sidewall portions 221. Furthermore, the first fixing device separably fixes a part, which is pivotally attached to the adaptor 220 and is configured to cover a frontward portion of the first coupling element 10, 10', to the adaptor 220, thereby locking the first coupling element 10, 10' relative to the upper ends 221b of the sidewall portions 221.

In this embodiment, said first fixing device includes the following: a pivot pin 226a fitted to the concave portions 14a, 14b, 14a, 14b' of the first coupling element 10, 10'; a lug 226b contacting the frond end surface of the first coupling element 10, 10' (the front end of the side plates 12a, 12b, 12a, 12b'); a cover attached to the adaptor 220; and a cover fixing device configured to separably fix the cover 230 to the adaptor 220.

The pivot pin 226a is located at the rear end of each sidewall portion 221. The pivot pin 226a is configured to be fitted to the concave portions 14a, 14b, 14a, 14b' formed in the side plates 12a, 12b, 12a, 12b'. The pivot pin 226a has a rounded front end and substantially parallel top and bottom surfaces. The rounded front end of the pivot pin 226a contacts the center of the concave portion 14a, 14b, 14a, 14b'. The lug 226b is opposed to the pivot pin 226a. The lug 226b protrudes on the outer surface of each sidewall portion 221 and extends vertically. The lug 226b is positioned to face to the front end surfaces of the side plates 12a, 12b, 12a, 12b' of the first coupling element 10, 10' with a little play or clearance when the adaptor 220 is pivoted into the receiving space. A distance between the pivot pin 226a and lug 226b is substantially equal to or slight greater than the distance between the concave portion 14a, 14b, 14a, 14b' of the side plate 12a, 12b, 12a, 12b' and the front end surface of the side plate 12a, 12b, 12a, 12b'.

The cover 230 is attached to the adaptor 220 to be pivotable in a direction perpendicular to an axis extending through the pivot holes 224a formed in the sidewall portions 224. The cover 230 participates in the fixing activity of the first fixing device and functions to cover or hide the distal end portions of the first and second coupling elements 10, 10', 20 and the adaptor 220 in part. The cover 230 has a generally inverted U-shape cross section. The cover 230 has a top plate 231c and a pair of side plates 231a, 231b. When the cover 230 is fixed to the adaptor 220, the top plate 231c is placed on top of the sidewall portions 221 and the side plates 231a, 231b face to the sidewall portions 221, respectively. Fitting pins 232 for pivotal attachment of the cover 230 to the adaptor 220 protrude inwardly of the cover 230 in one end portion of the cover 230, that is, a front end of the side plates 231a, 231b. The fitting pins 232 are fitted to the apertures 224c formed in the vicinity of the second bridge portion 223 of the adaptor 220, respectively. The fitting pin 232 has a beveled surface at its lower portion to facilitate the fitting engagement. The cover 230 may be easily attached to the adaptor 220 by contacting the fitting pins 232 to the front end of the sidewall portions 221 and pressing it toward the adaptor 220.

The cover 230 is separably fixed to the adaptor 220 by said cover fixing device. Said cover fixing device may comprise a first locking element formed in the cover 230 and a second locking element provided in the adaptor 220 and configured to complementarily engage the first locking element. Said first and second locking elements are configured to snap-engage or elastically engage to each other. Said first locking element may include a rear lower edge of the cover 230. Said second locking element may include a part that is formed complementary to said edge and elastically engages said edge. The engaging part may include a latch that extends from the adaptor 220 and is flexible so as to elastically curve or flex inwardly of or outwardly of the adaptor 220. Said cover fixing device fixes the cover 230 to the adaptor 220 through engagement between the first locking element and the second locking element when the cover 230 is pivoted to the adaptor 220.

In this embodiment, said first locking element includes a locking notch 234 formed in the rear lower edge of each side plate 231a, 231b of the cover 230. The locking notch 234 has a V-shape concave toward the adaptor 220. The locking notch 234 has a first stopper surface 234a, a first engagement surface 234b and a pressure surface 234c. The first stopper surface 234a extends generally horizontally. The first engagement surface 234b adjoins the first stopper surface 234a and extends rearward from a front end of the first stopper surface 234a. The first stopper surface 234a and the first engagement surface 234b form an acute angle therebetween. The pressure surface 234c adjoins the first engagement surface 234b and is located inside the lower edge of the side plate 231a, 231b. The pressure surface 234c is inclined outwardly of the side plate 231a, 231b.

In this embodiment, said second locking element includes a latch 225 provided in each sidewall portion 221. The latch 225 snap-engages or elastically engages the locking notch 234 when the cover 230 is pivoted to the adaptor 220. The latch 225 is located on each sidewall portion 221 to correspond to the locking notch 234. In the illustrated embodiment, the latch 225 has a latch arm 225a that extends frontward of the sidewall portion 221 from a stopper 228 formed on the outer surface of each sidewall portion 221. The latch arm 225a is spaced from the outer surface of each sidewall portion 221. A front end or leading end of the latch 225 has a shape complementarily mating with the concave shape of the locking notch 234. The latch 225 has a second engagement surface 225c and a second stopper surface 225b adjoining the second engagement surface 225c at its front end. The second engagement surface 225c engages the first engagement surface 234b of the locking notch 234. The second stopper surface 225b is formed complementarily with the first stopper surface 234a and contacts the first stopper surface 234a. The second engagement surface 225c is inclined rearward of the sidewall portion 221 at an acute angle relative to the second stopper surface 225b. Further, the latch 225 has a contact surface 225d at its front end. The contact surface 225d is formed adjacent to the second engagement surface 225c between second stopper surface 225b and the second engagement surface 225c.

Engagement between the locking notch 234 and the latch 225 fixes the cover 230 to the adaptor 220. If the cover 230 is pivoted to the adaptor 220, then the pressure surface 234c of the locking notch 234 in the lower edge of the side plate 231a, 231b is brought into abutment with the contact surface 225d of the latch 225. If the cover 230 is further pivoted downward from such an abutment state, then the latch arm 225a of the latch 225 is elastically curved or flexed toward the sidewall portion 221 by the reaction resulting from such further pivot. That is, the mutual contact between the pressure surface 234c and the contact surface 225d allows the latch arm 225a to curve. Thereafter, if the first stopper surface 234a and the first engagement surface 234b of the locking notch 234 conform in shape to the second stopper surface 225b and the second engagement surface 225c in the front end of the latch 225 after further pivoting of the cover 230, then the latch arm 225 returns outwardly and thus the locking notch 234 and the latch 225 are engaged to each other. Thus, the cover 230 is fixed to the adaptor 220. An engagement position between the locking notch 234 and the latch 225 is set such that the front portion of the top plate 11, 11' of the first coupling element 10, 10' or the front portion of the top plate 21 of the second coupling element 20 may be interposed between a lower surface of the top plate 231c of the cover 230 and the upper edges of the sidewall portions 221 with a little or without any play or clearance.

If the cover 230 is pivoted and then fixed to the adaptor 220 as described above, a portion of the front portion of the top plate 11, 11' of the first coupling element 10, 10' is positioned under the lower surface of the top plate 231c of the cover 230. The rear portion of the cover 230 fixes the front portion of the first coupling element 10, 10' relative to the upper edges 221b of the sidewall portions 221 (or the seat surface 222a of the first bridge portion 222), thus preventing the adaptor 220 from being separated from the first coupling element 10, 10'.

In other embodiments, said latch may protrude from the outer surface 221a of the sidewall portion 221 and extend forwardly. Further, said pressure surface of the locking notch may be inclined outward in an outer surface of the side plate of the cover 230 and said contact surface of the latch may be inclined outwardly of the sidewall portions 221 accordingly. In such a case, the latch may be curved outwardly when engaging the cover 230. Further, in some embodiment, said locking notch may not include said first stopper surface and said latch may not include said second stopper surface.

The cover 230 includes an element for preventing shaking motion relative to an axis of the fitting pins 232. In the illustrated embodiment, the cover 230 has a plurality of ribs or protrusions 235 protruding from an inner surface of each side plate 231a, 231b. When the cover 230 is locked to the adaptor 220, the protrusions 235 is positioned beside the outer surface of each sidewall portion 221 with a little or without any gap therebetween. Further, the cover 230 has a notch 235, which corresponds to a bearing aperture 224b provided in the adaptor 220, at the rear edge of each side plate 231a, 231b. In the illustrated embodiment, the cover 230 has a raised or swelled portion 233, which is in the rear of the side plate 231a and is raised laterally. The notch 236 is formed in the raised portion 233. The notch 236 is aligned with the bearing aperture 224b when the cover 230 is locked to the adaptor 220.

The adaptor 220 of the connecting unit 200 is fixed to the second coupling element 20 via the second fixing device. The second fixing device permits fitting between the side plates 22a, 22b of the second coupling element 20 and the sidewall portions 221 and fixes a rear end of the stopper portion 23a, 23b of the side plate 22a, 22b of the second coupling element 20 to the sidewall portion 221.

In this embodiment, said second fixing device includes the following: slide rails 227 sliding to inner surfaces of the side plates 22a, 22b of the second coupling element 20 and being fitted thereto; stoppers 228 disposed so as to abut the stopper portions 23a, 23b; and a latching lever 229 elastically latchable to a rear end surface of the stopper portion 23b of the side plate 22b.

The slide rail 227 extends along the lower edge of each sidewall portion 221 and protrudes outward. The slide rail 227 further protrudes than the pivot pin 226a. The stopper 228 protrudes downwardly from a front end of the slide rail 227. The stopper 228 is configured to abut a front end surface of each stopper portion 23a, 23b that protrudes inwardly from the lower edge of the side plate 22a, 22b. The latching lever 229 extends from the rear end of the sidewall portion 221. The latching lever 229 can elastically curve or flex outwardly of the sidewall portion 221. To this end, the rear end portion of the sidewall portion 221 is horizontally slit in part beneath the pivot pin 226a to thereby impart elasticity to the latching lever 229. The latching lever 229 is positioned such that when the adaptor 220 is fully inserted into the second coupling element 20, a frond end of the latching lever 229 snap-engages or latches to the rear end surface of the stopper portion 23b of the side plate 22b. In separating the adaptor 220 from the second coupling element 30, if the latching lever 229 is pushed downwardly or outwardly of the sidewall portion 221 and is then unlatched from the rear end of the stopper portion 23b, then the adaptor 220 can be separated from the second coupling element 20.

The adaptor 220 of the connecting unit 200 is fixed to the third coupling element 30 via the third fixing device. The third fixing device pivotally bears the side pin 31 of the third coupling element 30 parallel to an axis extending through the pivot holes 224a and fixes the clip arm 32 of the third coupling element 30 relative to the sidewall portions 221 of the adaptor 220. The third fixing device includes the following: bearing apertures to which the side pin 31 of the third coupling element 30 is pivotally inserted; a first contact portion which the clip arm 32 of the third coupling element 30 snap-engages and contacts; and a second contact portion to which a portion of the third coupling element 30 (e.g., a side 31a in which the side pin 31 of the third coupling element 30 is located) contacts.

In this embodiment, the bearing aperture 224b of the third fixing device is perforated in each sidewall portion 221. The bearing aperture 224b is formed in each sidewall portion 221 so as to be located on another axis parallel to the axis extending through the pivot holes 224a. The side pin 31 of the third coupling element 30 is pivotally fitted to the bearing apertures 224b. Further, the bearing apertures 224b are located in front of the pivot holes 224a. Said first contact portion includes the outer surface 221a and the upper end 221b in the sidewall portion 221 opposite to the sidewall portion 221 which the side pin 31 enters. Said second contact portion includes the raised portion 233 formed in the cover 230. A distance between a surface of the raised portion 233 and the outer surface of the sidewall portion 221 is set such that the clip arm 32 can be snap-engaged to the outer surface of the sidewall portion 221.

Figure 37:
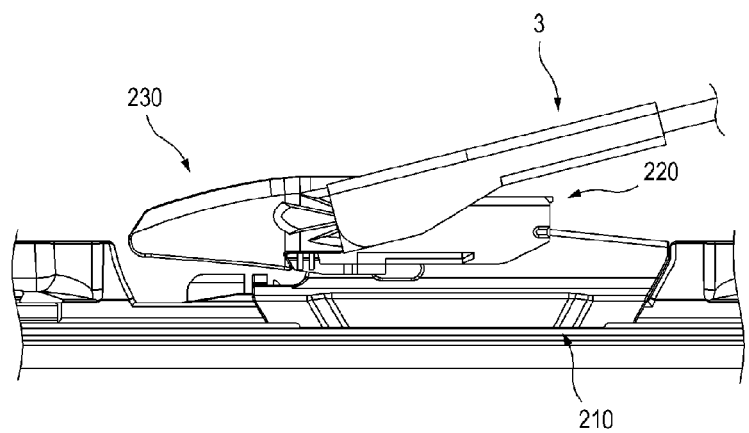
FIG. 37 shows a pivoting motion between the side lock wiper arm and the flat wiper blade according to one embodiment.
Figure 38:
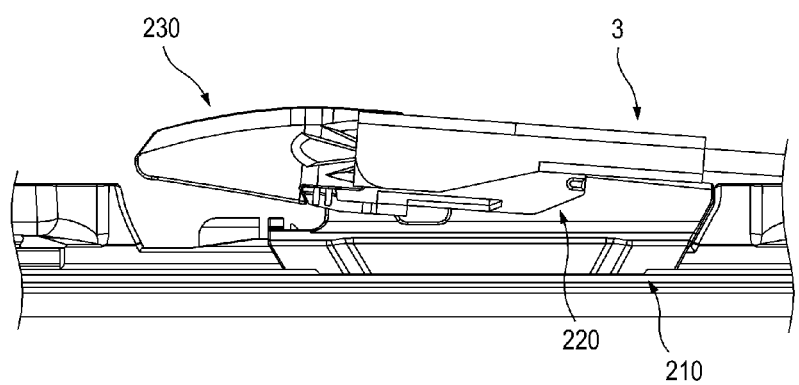
FIG. 38 shows a pivoting motion between the side lock wiper arm and the flat wiper blade according to one embodiment.

The axis extending through the pivot holes 224a, to which the pivot shaft 213 is fitted, and the axis extending through the bearing apertures 224b, to which the side pin 31 is fitted, are spaced parallel to each other. Accordingly, when the flat wipe blade 100 is connected to the wiper arm 3 via the third fixing device, an assembly comprised of the wiper strip 100, the frame bar 120, the first and second spoilers 130, 140 and the bracket 210 is pivotable around the pivot shaft 213 (i.e., around the axis extending through the pivot holes 224a) with respect to the adaptor 220. Further, since the side pin 31 is coupled to the adaptor 230 via the bearing apertures 224b, said assembly and the adaptor 220 is pivotable around the side pin 31. That is, as shown in FIGS. 37 and 38, when the wiper arm 3 operates, said assembly can pivot around the pivot shaft 213 with respect to the adaptor 220, while both said assembly and the adaptor 220 can pivot around the side pin 31 with respect to the wiper arm 3. As such, two pivot axes of the side pin 31 and the pivot shaft 213 (i.e., the axis extending through the pivot holes 224a and the axis extending through the bearing apertures 224b) exist between the connecting unit 200 and the third coupling element 30, thus providing stable pivoting structure therebetween and allowing the wiper strip 110 to be in close contact with the windshield surface in conformity with the curvature of the windshield surface.

Figure 28:
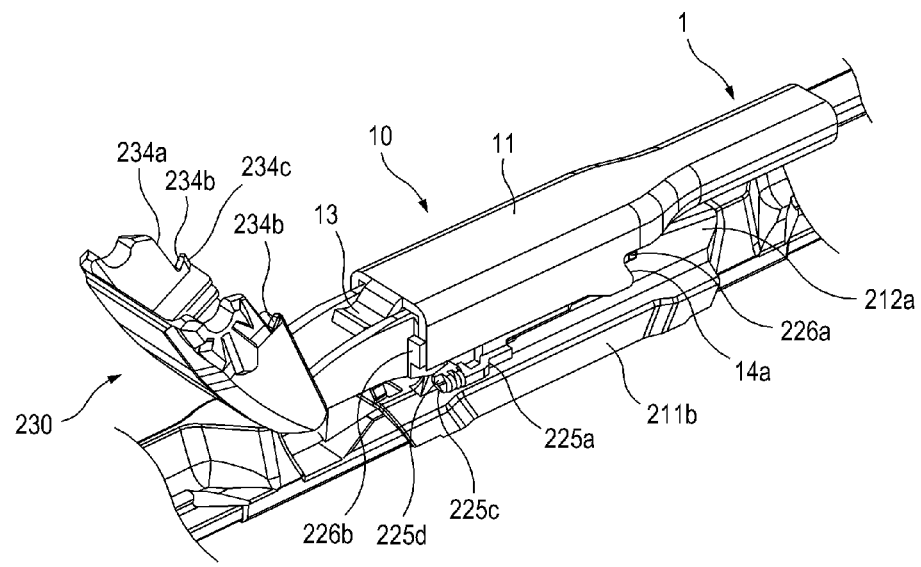
FIG. 28 shows an exemplary connection between a flat wiper blade and a top lock wiper arm using the connecting unit.
Figure 29:
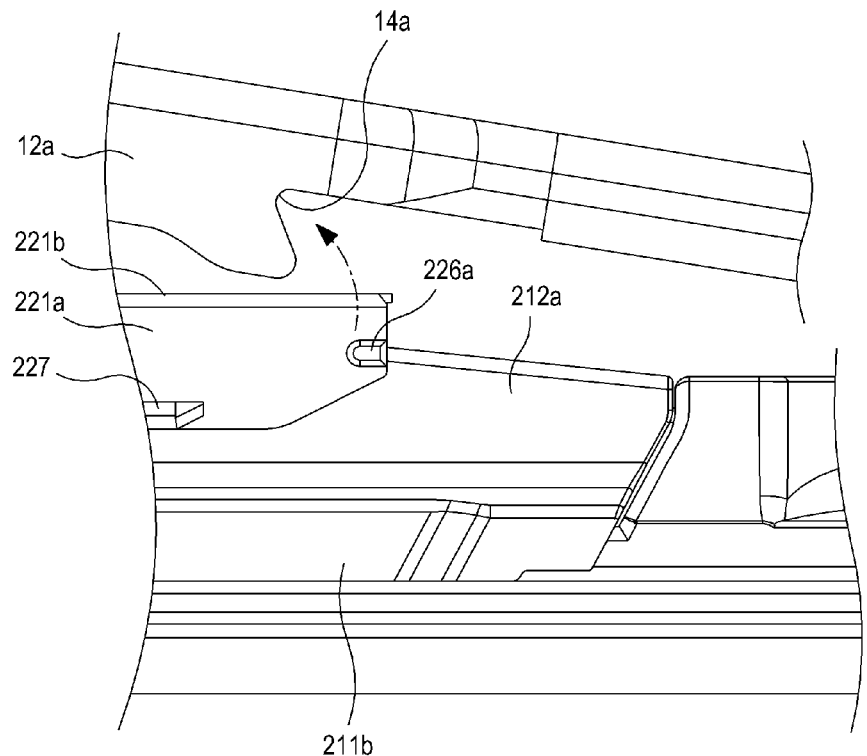
FIG. 29 shows an exemplary connection between a flat wiper blade and a top lock wiper arm using the connecting unit.
Figure 30:
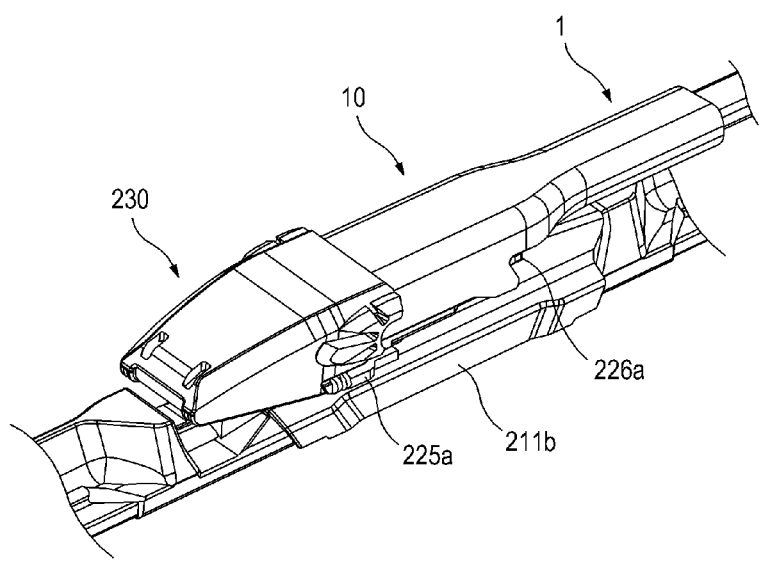
FIG. 30 shows an exemplary connection between a flat wiper blade and a top lock wiper arm using the connecting unit.

FIGS. 28 to 30 illustrate a connection example between the connecting unit 200 and the wiper arm 1 with the first coupling element 10 at its distal end. With reference to FIGS. 1 and 28 to 30, an exemplary connection example between the flat wiper blade 100 and the wiper arm 1 will be described in detail.

As the cover 230 is turned upward from the adaptor 220, the pivot pins 226a of the adaptor 220 are fitted to the corresponding concave portions 14a, 14b of the first coupling element 10 respectively, as shown in FIG. 29. As the pivot pins 226a are contacted to the centers of the concave portions 14a, 14b, the adaptor 220 (and the flat wiper blade 100 with the adaptor 220 mounted thereon) can be pivoted to the first coupling element 10 around the pivot pins 226a. When fully pivoted as shown in FIG. 28, the tongue 13 lies between the forward portions of the sidewall portions 221 and the front end surfaces of the side plates 12a, 12b of the first coupling element 10 contact the lug 226b or are positioned relative to the lug 226b with a little gap therebetween. Subsequently, the cover 230 is turned back toward the adaptor 220. Then, the first stopper surface 234a of the locking notch 234 and the second stopper surface 225b of the latch 225 abut each other and the first engagement surface 234b of the locking notch 234 and the second engagement surface 225c of the latch 225 are brought into engagement with each other. As a result, the cover 230 is locked to the adaptor 220 and a portion of the top plate 231c of the cover 230 abuts the top surface of the top plate 11 of the first coupling element 10, thus fixing the top plate of the first coupling element 10 relative to the upper ends 221b (the seat surface 222a) of the sidewall portions 221. As such, the flat wiper blade 100 is connected to the wiper arm 1 with the first coupling element 10 at its distal end in such a manner that the adaptor 220 is hung or caught to the first coupling element 10 through pivot pins 226a at the rear end of the adaptor and the cover 230 fixes the first coupling element 10 at the front end of the adaptor.

Figure 31:
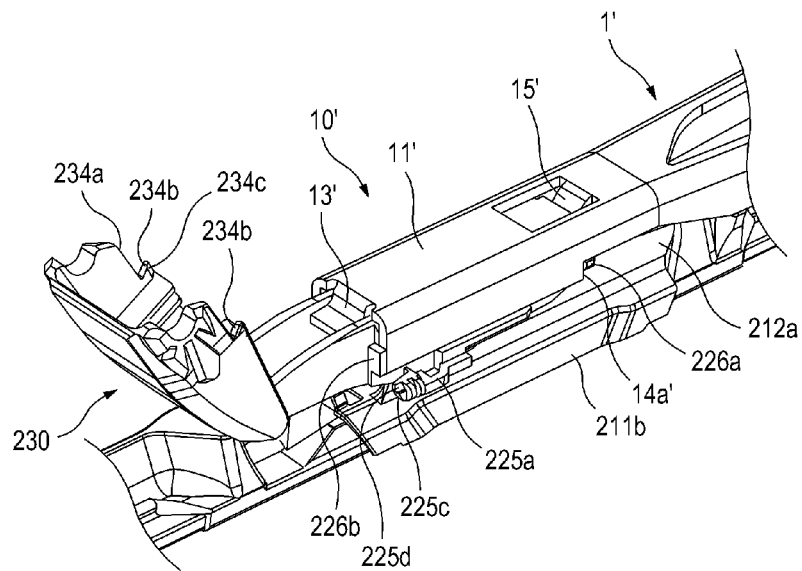
FIG. 31 shows an exemplary connection between a flat wiper blade and another top lock wiper arm using the connecting unit.
Figure 32:
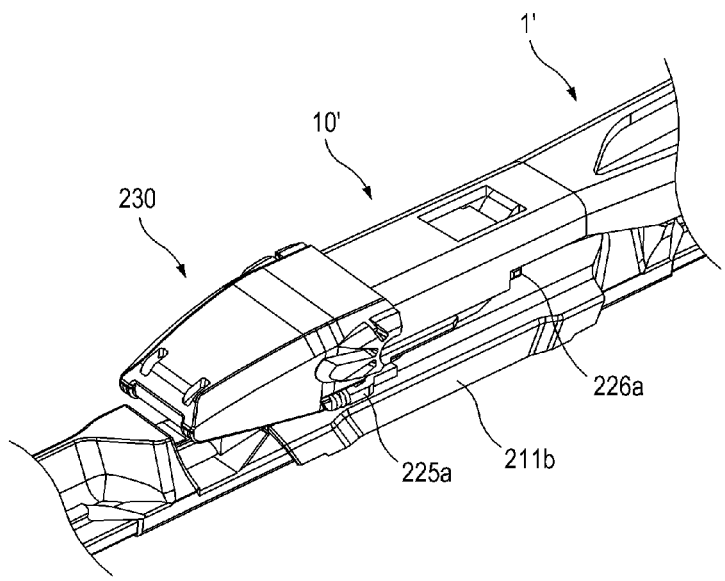
FIG. 32 shows an exemplary connection between a flat wiper blade and another top lock wiper arm using the connecting unit.

FIGS. 31 and 32 illustrate a connection example between the connecting unit 200 and the wiper arm 1' with another first coupling element 10' at its distal end.

As the cover 230 is turned upward from the adaptor 220, the pivot pins 226a are fitted to the corresponding concave portions 14a, 14b' of the first coupling element 10' respectively. Further, the second tongue 15' is hung to a rear end of the seat surface 222a of the first bridge portion 222. Subsequently, the flat wiper blade 100 with the adaptor 220 mounted thereon is pivoted to the first coupling element 10' and the adaptor 220 and the first coupling element 10' are contacted to each other at their corresponding parts. Thereafter, the cover 230 is turned back toward the adaptor 220 and then fixed to the adaptor 220. The connecting unit 200 is fixed to the wiper arm 1' with the first coupling element 10' in the same manner as the first coupling element 10.

Figure 33:
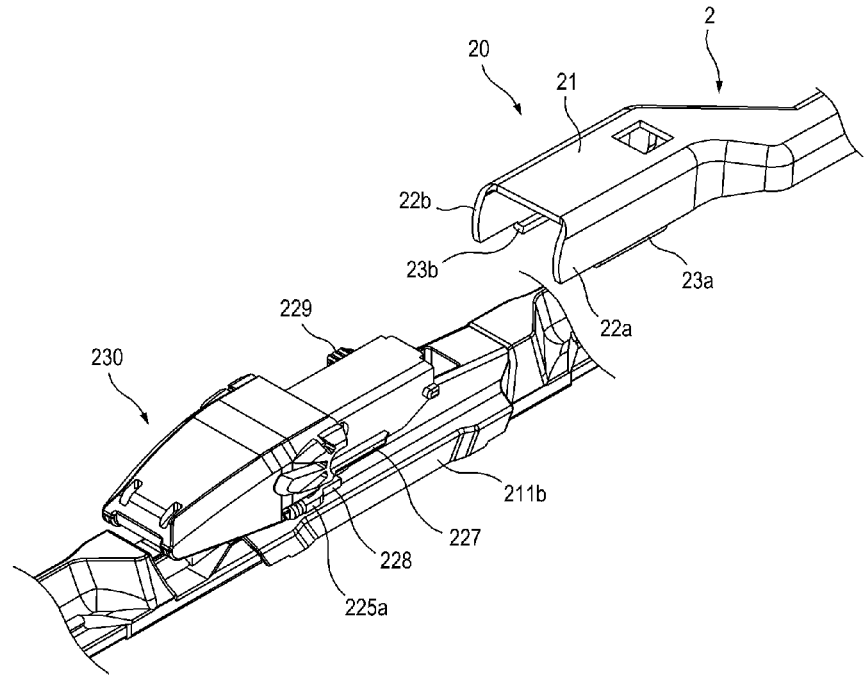
FIG. 33 shows an exemplary connection between a flat wiper blade and a bayonet wiper arm using the connecting unit.
Figure 34:
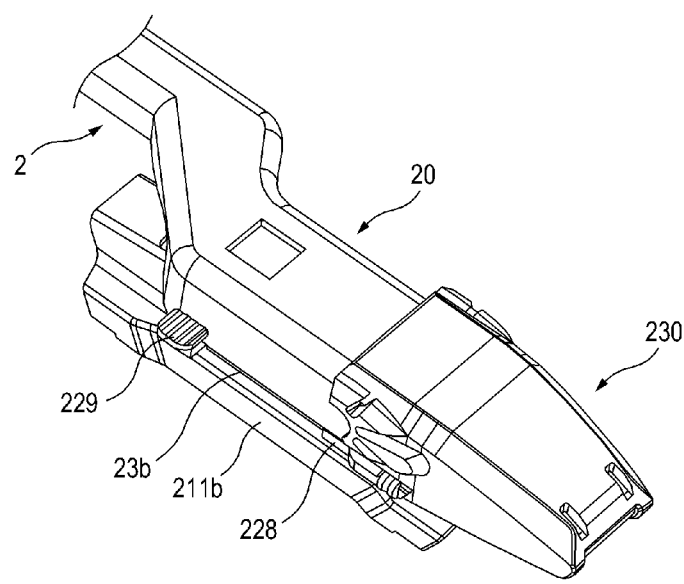
FIG. 34 shows an exemplary connection between a flat wiper blade and a bayonet wiper arm using the connecting unit.

FIGS. 33 and 34 illustrate a connection example between the connecting unit 200 and the wiper arm 2 with the second coupling element 20 at its distal end.

As shown in FIG. 33, the adaptor 220 mounted on the flat wiper blade 100 is inserted into the second coupling element 20 from the rear end of the adaptor 220. Then, the adaptor 220 is fitted to the second coupling element 30 as the slide rails 227 are in slide contact with the inner surfaces of the side plates 22a, 22b, respectively. When the front end surfaces of the stopper portions 23a, 23b abut the stopper 228 and the latching lever 229 is latched to the rear end surface of the stopper portion 23b of the side plate 22b, the fixing of fitting is finished. The latching lever 229 is latched to the rear end surface of the stopper portion 23b of the side plate 22b, thus preventing the adaptor 220 from being separated from the second coupling element 20.

Figure 35:
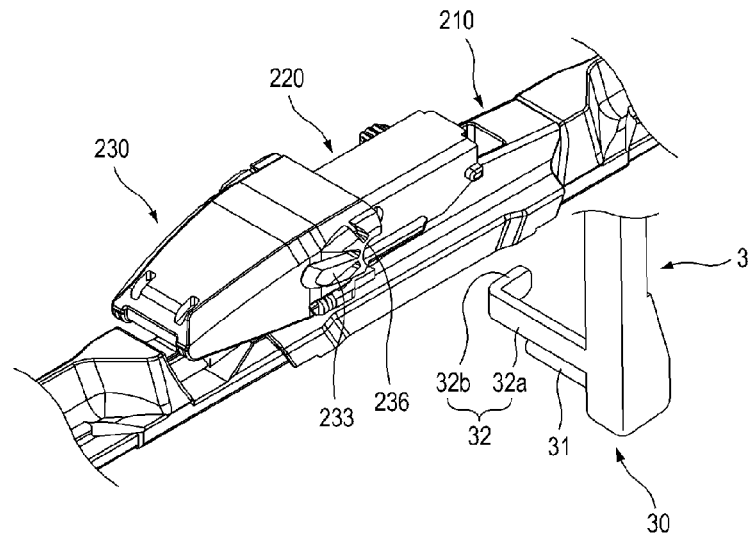
FIG. 35 shows an exemplary connection between a flat wiper blade and a side lock wiper arm using the connecting unit.
Figure 36:
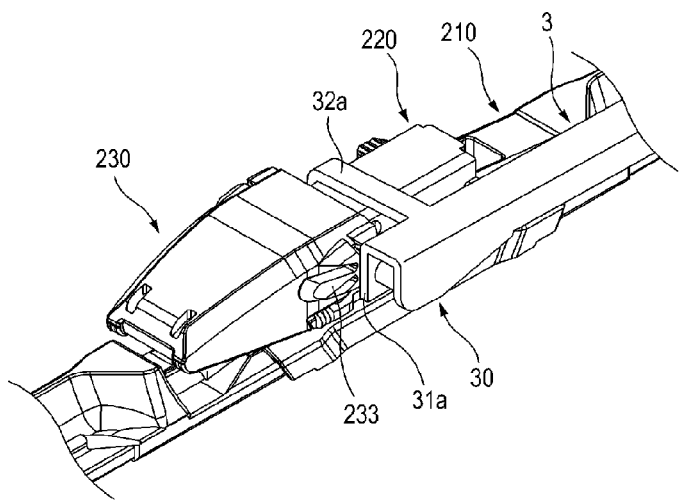
FIG. 36 shows an exemplary connection between a flat wiper blade and a side lock wiper arm using the connecting unit.

FIGS. 35 and 36 illustrate a connection example between the connecting unit 200 and the wiper arm 3 with the third coupling element 30 at its distal end.

As shown in FIG. 35, the flat wiper blade 100 with the adaptor 220 mounted thereon is connected to the wiper arm 3 in such a manner that the side pin 31 is inserted or fitted to the bearing apertures 224b. Such insertion is finished when the side 31a of the third coupling element 30 with the side pin 31 contacts the outer surface of the raised portion 233 of the cover 230. As the side pin 31 is fitted to the bearing apertures 224b, the adaptor 220 (and the flat wiper blade 100) can be pivoted around the side pin 31. Subsequently, the adaptor 220 and the flat wiper blade 100 are pivoted toward the wiper arm 3 such that the stopper section 32a of the clip arm 32 is brought into contact with the upper edge 221b of the sidewall portion 221. Then, the clip section 32b is snap-engaged to the outer surface 221a of the sidewall portion 221. As shown in FIG. 36, the side pin 31 is fitted to the bearing apertures 214b and the side 31a of the third coupling element 30 is in contact with the raised portion 233 of the cover 230 and the clip section 32b is engaged to the outer surface 221a of the sidewall portion 221. Thus, the connecting unit 200 and the third coupling element 30 are fixed to each other through fixing of inserting and then pivoting.

While the present invention has been shown and described by way of the foregoing embodiments, the present invention should not be limited thereto. It will be apparent to those of ordinary skill in the art that various alternations or modifications may be made without departing from the scope of the present invention.

The invention claimed is:

1. A connecting unit (200) for separably connecting a flat wiper blade (100) to a wiper arm (1, 1', 2, 3), said wiper arm having one of the following at a distal end: a first coupling element (10, 10') including a top plate (11, 11') and a pair of spaced parallel side plates (12a, 12b, 12a', 12b') each having a concave portion (14a, 14b, 14a', 14b') at a rear end; a second coupling element (20) including a top plate (21) and a pair of spaced parallel side plates (22a, 22b); and a third coupling element (30) including a top plate and a pair of spaced parallel side plates, said third coupling element (30) is provided with a side pin (31) and a clip arm (32) at one side plate, the connecting unit comprising:

a bracket (210) configured to be fixed to a frame (120) of the flat wiper blade, the bracket having a pivot shaft (213); and an adaptor (220) having a top surface (222a) and a pair of parallel sidewall portions (221) joined thereto at upper ends (221b), each of said sidewall portions having a pivot hole (224a), the adaptor being pivotally mounted on the bracket such that both ends of the pivot shaft are fitted into the pivot holes and configured to be coupled to the wiper arm (1, 1', 2, 3) through one of the first (10, 10'), second (20), and the third (30) coupling elements of the wiper arm, wherein the adaptor includes:

a first fixing device (225, 226a, 226b, 230, 234) configured to fix the side plates (12a, 12b, 12a', 12b') of the first coupling element to respective outer surfaces (221a) of the sidewall portions (221) and fix at least a portion of the top plate of the first coupling element relative to the step (221b) of the adaptor;

a second fixing device (227, 228, 229) configured to permit fitting between the side plates (22a, 22b) of the second coupling element and the sidewall portions (221) and lock a lower end of one of the side plates (22a, 22b) of the second coupling element to one of the sidewall portions (221); and a third fixing device (224b) configured to pivotally bear the side pin (31) of the third coupling element parallel to an axis extending through the pivot holes and fix the clip arm (32) of the third coupling element relative to one of the sidewall portions (221), wherein the first fixing device comprises:
- a pivot pin (226a) formed at a rear end of each of the sidewall portions and configured to be fitted to the respective concave portion of the side plates of the first coupling element;
- a lug (226b) formed on each of the sidewall portions at a location spaced from the pivot pin on the same sidewall portion and being contactable to a front end of the side plate of the first coupling element;
- a cover (230) pivotally attached to a front end of the sidewall portions of the adaptor and configured to cover at least a portion of the first coupling element; and
- a cover fixing device (225, 234) configured to separably fix the cover to the adaptor to lock at least the portion of the top plate of the first coupling element relative to the step (221b) of the sidewall portions of the adaptor, wherein the cover fixing device comprises:
- a pair of locking notches (234) located at a lower edge of the cover and having a first engagement surface (234b); and
- a latch (225) extending from each of the sidewall portions and being flexible, the latch having a second engagement surface (225c) engageable to the first engagement surface at a front end, wherein when the cover is pivoted to the adaptor and the first and second engagement surfaces engage each other, the cover fixes the top plate of the first coupling element relative to the top surface of the adaptor, and wherein the third fixing device comprises:
- a bearing aperture (224b) formed in each of sidewall portions and located in an axis parallel to the axis extending through the pivot holes in front of the pivot hole of each of the sidewall portions, the side pin (31) of the third coupling element being insertable to the bearing aperture, and
- the clip arm snap-engaging one of the outer surfaces of the sidewall portions.

2. The connecting unit of claim 1, wherein the locking notch includes a pressure surface (234c) adjoining the first engagement surface and the latch includes a contact surface (225d) adjoining the second engagement surface, and
wherein when the cover is pivoted to the adaptor, the pressure surface and the contact surface contact each other to allow the latch to flex relative to one of the sidewall portions.

3. The connecting unit of claim 1, wherein the latch includes a second stopper surface (225b) adjoining the second engagement surface at a top surface and the locking notch includes a first stopper surface (234a) adjoining the first engagement surface and contacting the second stopper surface.

4. The connecting unit of claim 1, wherein each of the sidewall portions has a stopper (228) configured to abut the lower end of each of the side plates of the second coupling element, and
wherein the latch extends from the stopper.

5. The connecting unit of claim 1,
wherein the cover is configured to fix the top plate of the first coupling element relative to the top surface of the adaptor, when the cover is pivoted to the adaptor and the first and second engagement surfaces engage each other.

6. The connecting unit of claim 1, wherein the second fixing device comprises a slide rail (227) formed on the outer surface of each sidewall portion and being fitted to an inner surface of each of the side plates of the second coupling element.

7. The connecting unit of claim 6, wherein the second coupling element includes a stopper portion (23a, 23b) protruding from the lower end of each side plate, and
wherein the second fixing device further comprises:
- a stopper (228) protruding from the slide rail and configured to abut a front end of the stopper portion; and
- a latching lever (229) formed at a rear end of one of the sidewall portions and configured to elastically latch a rear end of the stopper portion.

8. The connecting unit of claim 1, wherein the cover is pivotally attached to the front ends of the sidewall portions in a direction perpendicular to the axis extending through the pivot holes, and
wherein the cover has a raised portion (233) which a portion of the third coupling element contacts.

9. The connecting unit of claim 1, wherein the frame has a pair of notches (123) at opposed edges,
wherein the bracket includes a pair of holding claws (211f) and an engaging protrusion (211e) at each of lower opposed edges, and
wherein the edges of the frame lie on the holding claws and the notch and the engaging protrusion engage each other.

10. A flat wiper blade comprising:
- a wiper strip (110);
- a frame (120) configured to hold and support the wiper strip;
- first and second spoilers (130, 140) configured to be joined to the frame by fitting engagement; and
- a connecting unit (200) for separable connection to a wiper arm (1, 1', 2, 3) having one of the following at a distal end: a first coupling element (10, 10') including a top plate (11, 11') and a pair of spaced parallel side plates (12a, 12b, 12a', 12b') having concave portions (14a, 14b, 14a', 14b') at a rear end; a second coupling element (20) including a top plate (21) and a pair of spaced parallel side plates (22a, 22b); and a third coupling element (30) including a side pin (31) and a clip arm (32), the connecting unit being coupled to the frame between the first and second spoilers, wherein the connecting unit comprises:
- a bracket (210) configured to be fixed to a frame (120) of the flat wiper blade, the bracket having a pivot shaft (213); and
- an adaptor (220) having a top surface (222a) and a pair of spaced parallel sidewall portions (221) joined thereto at upper ends (221b), each of said sidewall portions having a pivot hole (224a), the adaptor being pivotally mounted on the bracket such that both ends of the pivot shaft are fitted into the pivot holes and configured to be coupled to the wiper arm (1, 1', 2, 3) through one of the first (10, 10'), second (20), and the third (30) coupling elements of the wiper arm, wherein the adaptor includes:
- a first fixing device (225, 226a, 226b, 230, 234) configured to fix the side plates (12a, 12b, 12a', 12b') of the first coupling element to respective outer surfaces (221a) of the sidewall portions (221) and fix at least a portion of the top plate of the first coupling element relative to the step (221b) of the adaptor;
- a second fixing device (227, 228, 229) configured to permit fitting between the side plates (22a, 22b) of the second coupling element and the sidewall portions (221) and lock a lower end of one of the side plates (22a, 22b) of the second coupling element to one of the sidewall portions (221); and a third fixing device (224b) configured to pivotally bear the side pin (31) of the third coupling element parallel to an axis extending through the pivot holes and fix the clip arm (32) of the third coupling element relative to one of the sidewall portions (221), wherein the first fixing device comprises:

a pivot pin (226a) formed at a rear end of each of the sidewall portions and configured to be fitted to the respective concave portion of the side plates of the first coupling element;

a lug (226b) formed on each of the sidewall portions at a location spaced from the pivot pin on the same sidewall portion and being contactable to a front end of the side plate of the first coupling element;

a cover (230) pivotally attached to a front end of the sidewall portions of the adaptor and configured to cover at least a portion of the first coupling element; and a cover fixing device (225, 234) configured to separably fix the cover to the adaptor to lock at least the portion of the top plate of the first coupling element relative to the step (221b) of the sidewall portions of the adaptor, wherein the cover fixing device comprises:

a pair of locking notches (234) located at a lower edge of the cover and having a first engagement surface (234b); and a latch (225) extending from each of the sidewall portions and being flexible, the latch having a second engagement surface (225c) engageable to the first engagement surface at a front end, wherein when the cover is pivoted to the adaptor and the first and second engagement surfaces engage each other, the cover fixes the top plate of the first coupling element relative to the top surface of the adaptor, and wherein the third fixing member comprises:

a bearing aperture (224b) formed in each of sidewall portions and located in an axis parallel to the axis extending through the pivot holes in front of the pivot hole of each of the sidewall portions, the side pin (31) of the third coupling element being insertable to the bearing aperture, and the clip arm snap-engaging one of the outer surfaces of the sidewall portions.

11. The flat wiper blade of claim 10, wherein the first spoiler and the bracket (210) of the connecting unit engage each other and the second spoiler and the bracket engage each other.

\* \* \* \* \*